United States Patent
Chen et al.

(10) Patent No.: US 12,437,437 B2
(45) Date of Patent: Oct. 7, 2025

(54) DIFFUSION MODELS HAVING CONTINUOUS SCALING THROUGH PATCH-WISE IMAGE GENERATION

(71) Applicant: ADOBE INC., San Jose, CA (US)

(72) Inventors: Yinbo Chen, La Jolla, CA (US); Michaël Gharbi, San Francisco, CA (US); Oliver Wang, Seattle, WA (US); Richard Zhang, Burlingame, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 420 days.

(21) Appl. No.: 18/052,658

(22) Filed: Nov. 4, 2022

(65) Prior Publication Data

US 2024/0161327 A1 May 16, 2024

(51) Int. Cl.
*G06T 7/70* (2017.01)
*G06T 3/40* (2024.01)
*G06T 5/73* (2024.01)
*G06T 7/10* (2017.01)

(52) U.S. Cl.
CPC .............. *G06T 7/70* (2017.01); *G06T 3/40* (2013.01); *G06T 5/73* (2024.01); *G06T 7/10* (2017.01); *G06T 2207/20084* (2013.01); *G06T 2207/20132* (2013.01); *G06T 2207/20212* (2013.01)

(58) Field of Classification Search
CPC .... G06T 7/70; G06T 3/40; G06T 5/73; G06T 7/10; G06T 2207/20084; G06T 2207/20132; G06T 2207/20212; G06T 11/60
See application file for complete search history.

(56) References Cited

PUBLICATIONS

Rombach, R., Blattmann, A., Lorenz, D., Esser, P., & Ommer, B. (Apr. 13, 2022). High-Resolution Image Synthesis with Latent Diffusion Models. ArXiv:2112.10752 [Cs]. https://arxiv.org/abs/2112.10752 (Year: 2022).*

Özdenizci, O., & Legenstein, R. (Jul. 29, 2022). Restoring Vision in Adverse Weather Conditions with Patch-Based Denoising Diffusion Models. ArXiv.org. https://arxiv.org/abs/2207.14626 (Year: 2022).*

Wandell, B. (1995). Foundations of Vision» Chapter 8: Multiresolution Image Representations. Stanford.edu. https://foundationsofvision.stanford.edu/chapter-8-multiresolution-image-representations/#Threshold_and_Recognition (Year: 1995).*

Chen, Y., Wang, O., Zhang, R., Shechtman, E., Wang, X., & Gharbi, M. (2024). Image Neural Field Diffusion Models. ArXiv.org. https://arxiv.org/abs/2406.07480 (Year: 2024).*

(Continued)

*Primary Examiner* — Gregory A Morse
*Assistant Examiner* — David Alexander Wambst
(74) *Attorney, Agent, or Firm* — F. CHAU & ASSOCIATES, LLC

(57) ABSTRACT

Aspects of the methods, apparatus, non-transitory computer readable medium, and systems include obtaining a noise map and a global image code encoded from an original image and representing semantic content of the original image; generating a plurality of image patches based on the noise map and the global image code using a diffusion model; and combining the plurality of image patches to produce an output image including the semantic content.

20 Claims, 16 Drawing Sheets

(56) References Cited

PUBLICATIONS

Xia, W., Cong, W., & Wang, G. (Nov. 18, 2022). Patch-Based Denoising Diffusion Probabilistic Model for Sparse-View CT Reconstruction. ArXiv.org. https://doi.org/10.48550/arXiv.2211.10388 (Year: 2022).*
Lin, C. H., Chang, C.-C., Chen, Y.-S., Juan, D.-C., Wei, W., & Chen, H.-T. (Jan. 5, 2020). COCO-GAN: Generation by Parts via Conditional Coordinating. ArXiv.org. https://doi.org/10.48550/arXiv.1904.00284 (Year: 2020).*
Ntavelis, E., Shahbazi, M., Kastanis, I., Timofte, R., Danelljan, M., & Gool, V. (Apr. 5, 2022). Arbitrary-Scale Image Synthesis. ArXiv.org. https://arxiv.org/abs/2204.02273 (Year: 2022).*
Luhman, T., & Luhman, E. (Jul. 9, 2022). Improving Diffusion Model Efficiency Through Patching. ArXiv.org. https://arxiv.org/abs/2207.04316 (Year: 2022).*
Peebles, W., & Xie, S. (Mar. 2, 2023). Scalable Diffusion Models with Transformers. https://arxiv.org/pdf/2212.09748 (Year: 2023).*
Wang, Y., Yu, J., Yu, R., & Zhang, J. (Mar. 1, 2023). Unlimited-Size Diffusion Restoration. ArXiv.org. https://arxiv.org/abs/2303.00354v1 (Year: 2023).*
Wang, W., Bao, J., Zhou, W., Chen, D., Chen, D., Yuan, L., & Li, H. (Nov. 22, 2022). SinDiffusion: Learning a Diffusion Model from a Single Natural Image. ArXiv.org. https://arxiv.org/abs/2211.12445 (Year: 2022).*
Ding, Z., Zhang, M., Wu, J., & Tu, Z. (Aug. 2, 2023). Patched Denoising Diffusion Models For High-Resolution Image Synthesis. ArXiv.org. https://arxiv.org/abs/2308.01316 (Year: 2023).*
1Chai, et al, "Any-resolution Training for High-resolution Image Synthesis", arXiv preprint arXiv:2204.07156v2 [cs.CV] Aug. 5, 2022, 33 pages.
2Chen, et al, "Learning Continuous Image Representation with Local Implicit Image Function", arXiv preprint arXiv:2012.09161v2 [cs.CV] Apr. 1, 2021, 11 pages.
Bho, et al, "Cascaded Diffusion Models for High Fidelity Image Generation", arXiv preprint arXiv:2106.15282v3 [cs.CV] Dec. 17, 2021, 33 pages.
4Ho, et al, "Denoising Diffusion Probabilistic Models", NIPS'20: Proceedings of the 34th International Conference on Neural Information Processing Systems, arXiv preprint arXiv:2006.11239v2 [cs.LG] Dec. 16, 2020, 25 pages.
5Kingma, et al, "Auto-Encoding Variational Bayes", arXiv preprint arXiv:1312.6114v1 [stat.ML] Dec. 20, 2013, 9 pages.
6Kingma, et al, "Auto-Encoding Variational Bayes", arXiv preprint arXiv:1312.6114v10 [stat.ML] May 1, 2014, 14 pages.
7Rombach, et al, "High-Resolution Image Synthesis with Latent Diffusion Models", arXiv preprint arXiv:2112.10752v2 [cs.CV] Apr. 13, 2022, 45 pages.
8Saharia, et al, "Photorealistic Text-to-Image Diffusion Models with Deep Language Understanding", arXiv preprint arXiv:2205.11487v1 [cs.CV] May 23, 2022, 46 pages.

* cited by examiner

DIFFUSION MODELS HAVING CONTINUOUS SCALING THROUGH PATCH-WISE IMAGE GENERATION

BACKGROUND

The following relates generally to image processing, and more specifically to generating images using machine learning.

A variety of computer systems have been used to aid in the generation and manipulation of images. Computers can generate, store, interpret, and edit images in a discrete way using a two-dimensional (2D) arrays of pixels (i.e., digital images). Recently, machine learning models have been trained to edit and modify digital images.

For example, diffusion models have been trained to generate images based on random (or pseudo-random) noise. A diffusion model may be represented as a parameterized Markov chain trained using variational inference to produce samples matching the data after finite time. Diffusion models utilize a noise map and a denoising operation to generate images. The diffusion model includes a forward process that adds noise to input data, and a backwards process that reconstructs an image through a trained denoising process.

SUMMARY

The present disclosure describes systems and methods for generating high-resolution images using a diffusion model. Embodiments of the present disclosure provide a diffusion-based generative model that can learn from mixed-resolution datasets, and can generate a range of resolutions including high resolution images. The diffusion model can be trained with input images at various resolution, and may generate output images at various resolution. Embodiments of the disclosure generate high resolution images by creating multiple image patches corresponding to a specific location, and combining the patches to obtain the output image.

A method, apparatus, non-transitory computer readable medium, and system for high resolution diffusion model image generation are described. One or more aspects of the method, apparatus, non-transitory computer readable medium, and system include obtaining a noise map and a global image code encoded from an original image and representing semantic content of the original image; generating a plurality of image patches based on the noise map and the global image code using a diffusion model; and combining the plurality of image patches to produce an output image including the semantic content.

A method, apparatus, non-transitory computer readable medium, and system for high resolution diffusion model image generation is provided. The one or more aspects of the method, apparatus, non-transitory computer readable medium, and system include initializing parameters of a diffusion model; obtaining a noise map and a global image code encoded from a training image and representing semantic content of the training image; generating a plurality of predicted image patches based on the noise map and the global image code using the diffusion model; computing a loss function based on the plurality of predicted image patches; and training the diffusion model to generate image patches by updating the parameters based on the loss function.

An apparatus and system for high resolution diffusion model image generation are described. One or more aspects of the apparatus and system include a processor; a memory storing instructions executable by the processor, where the instructions can cause the one or more processors to: obtain a noise map and a global image code encoded from an original image and representing semantic content of the original image; generate a plurality of image patches based on the noise map and the global image code using a diffusion model; and combine the plurality of image patches to produce an output image including the semantic content.

DETAILED DESCRIPTION

Figure 1:
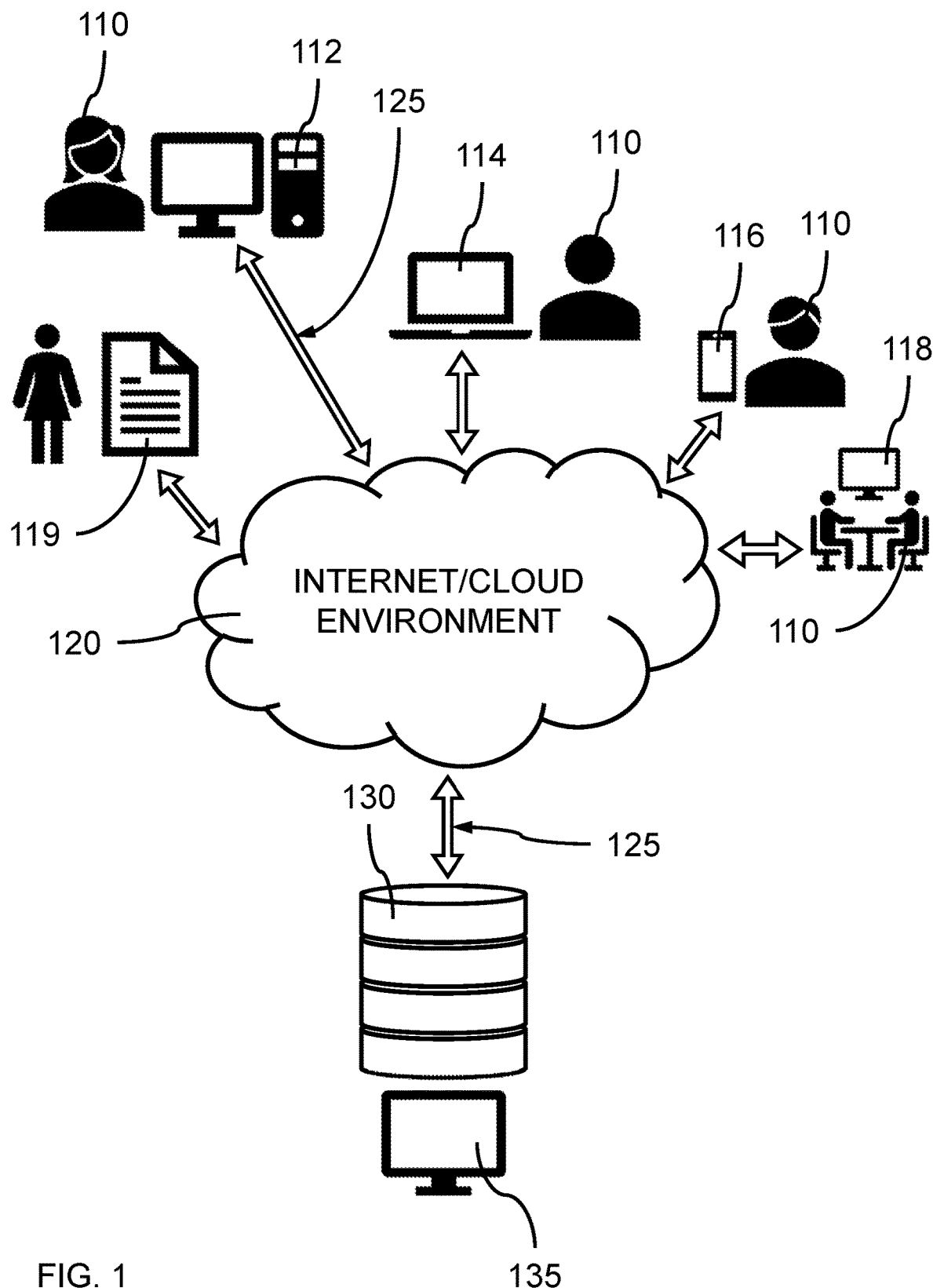
FIG. 1 is an illustrative depiction of a high-level diagram of users interacting with an image processing system, including a neural network for generating high resolution images, through their devices, according to aspects of the present disclosure.

The present disclosure relates to image processing and image generation using a diffusion model. In some embodiments, a diffusion model can be used to generate new images of varying sizes at different scales and resolutions.

Diffusion models are a class of machine learning models that can generate meaningful data based on random noise. For example, images can be generated that resemble images included in a training set. However, conventional diffusion models are typically trained to generate low resolution images (i.e., less than 1024×1024). Alternatively, high resolution images have been generated using extremely large models with a large number of parameters. These parameters can be costly to train and may be slow to generate images. Accordingly, embodiments of the present disclosure provide an improved image generation system that can generate high-resolution images using a reduced number of model parameters. For example, the output resolution can be greater than 1024×1024 pixels or higher. Some embodiments of the disclosure may be used to up-sample images to 30× or greater than the input image.

In various embodiments, the training of the diffusion model can include datasets with variable-size images, that can be collected and utilized at their native resolutions. Training of the diffusion model can include continuous-scale training, where patches of the training images can be sampled at random scales and used to train a new generator with variable output resolutions. The training may be accomplished through a single training stage, so that the representation can maximizes image quality by virtue of this end-to-end training procedure.

In various embodiments, a diffusion model that can generate high-resolution images, by building the image one image patch at a time is provided. To ensure patch to patch consistency, without visible seams, the model can be conditioned on a global latent variable that captures the image identity. The latent variable can be produced by an encoder that consumes a low-resolution version of the training image and learns to produce a meaningful latent code that summarizes the image content, where the latent encoder can be scale-agnostic. The patch-wise diffusion model can be conditioned on the patch coordinates and image scale, so that it is aware of where the patch being synthesizes fits within the larger image. The model can use a local diffusion model, G, conditioned on a global image code, z, image scale, s, and local patch coordinates, $c_i$, to efficiently generate high-resolution images, one patch at a time.

In one or more embodiments, a diffusion model is provided that can be conditioned on a target scale that allows higher resolution images to be generated without adding layers to the model. In various embodiments, a fixed-dataset constraint can be relaxed to allow simultaneously learning of global structure, for which large sets of readily-available low-resolution images suffice, and fine-scale details available from fewer high-resolution images. This can enable generating images at higher resolutions by adding in higher-resolution images to currently available fixed-size datasets. The image(s) can be represented with a continuous range of resolutions by modeling an image as a function defined in a continuous domain. This can restore and generate the image at arbitrary resolutions.

Accordingly, by utilizing a single training stage, the diffusion model can maximize image quality by virtue of this end-to-end training procedure. The diffusion model can also be trained with input images at any resolution, and can also output images at any resolution, including and going beyond 1024 pixels, through the single training stage. This approach can directly synthesize an image at high resolutions (e.g. 4096×4096 pixels), without the time and computing resources spent first generating a low-resolution image and then progressively up-sampling it, as in conventional diffusion models. Thereby, avoiding multiple stages and decreasing inference costs. This also avoids training a first stage diffusion generator at low-resolution (e.g., 256×256 pixels), and separately training one or more image up-sampler stages. Unlike fixed input resolution models, the presently described model can be trained on datasets with varying image sizes, thereby providing access to more training samples.

Image Processing System and Architecture

FIG. 1 is an illustration of users interacting with an image processing system, including a neural network for generating high resolution images, through their devices, according to aspects of the present disclosure.

In one or more embodiments, a user 110 can interact with a remote image processing system 130 through the cloud/internet 120 by electronic communication 125. A user 110 may interact with the image processing system 130 using, for example, a desktop computer 112, a laptop computer 114, a handheld mobile device 116, for example, a smart phone or tablet, a smart tv 118, or document processing system 119, including a scanner, fax machine, and/or document/image processing software. In various embodiments, the image processing system 130 can include, for example, a deep neural network, including, but not limited to, a diffusion model (DM), variational autoencoder (VAE), generative adversarial network (GAN), convolutional neural networks (CNN), transformer networks, encoder neural networks, multi-layer perceptrons (MLPs), and combinations thereof, although other deep neural networks are also contemplated.

In various embodiments, the user 110 can communicate 125 with the image processing system 130 to submit data (e.g., image(s)) for image processing, and receive results from the image processing system 130, for example, new image(s) at a different resolution.

In various embodiments, the cloud 120 is a computer network configured to provide on-demand availability of computer system resources, such as data storage and computing power. In some examples, the cloud 120 provides resources without active management by user 110. The internet/cloud environment 120 can include data centers available to multiple users over the Internet, where the internet can be a global computer network providing a variety of information and communication facilities. Some large cloud networks have functions distributed over multiple locations from central servers. A server is designated an edge server if it has a direct or close connection to a user. In some cases, cloud environment 120 may be limited to a single organization. In other examples, cloud 120 is available to many organizations, where communication may be through the internet. In an example, the cloud/internet 120 includes a multi-layer communications network comprising multiple edge routers and core routers. In another example, cloud 120 is based on a local collection of switches in a single physical location. According to some aspects, the internet/cloud environment 120 provides electronic communications between user device(s) 112, 114, 116, 118, and the image processing system 130.

In various embodiments, the user devices 112, 114, 116, 118, 119, can include software that can communicate and interact with the image processing system(s) 130, including, but not limited to, submitting a digital image (e.g., photos, movies, etc.) for processing.

Figure 2:
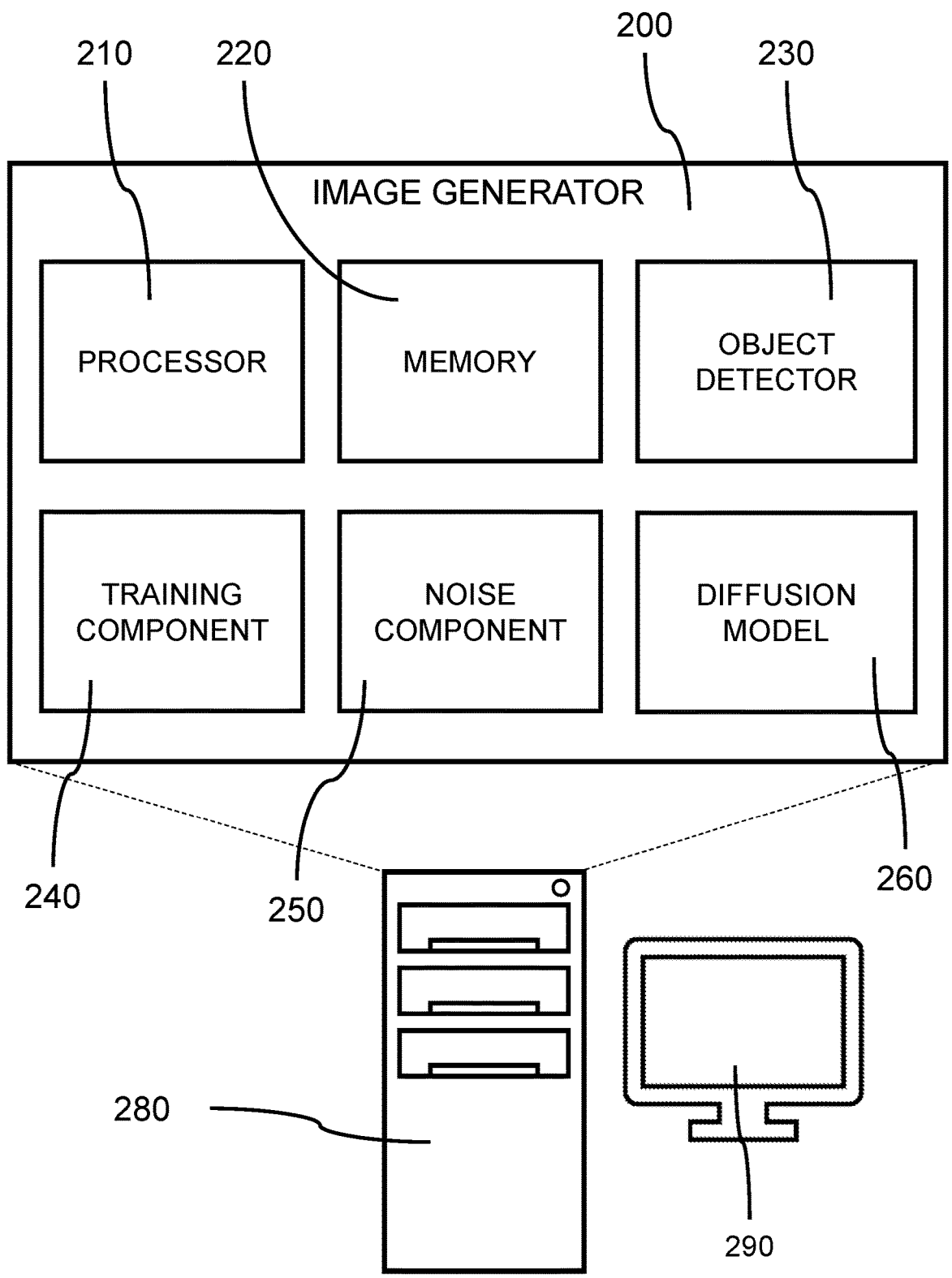
FIG. 2 shows a block diagram of an example of an image generator according to aspects of the present disclosure.

FIG. 2 shows a block diagram of an example of an image generator according to aspects of the present disclosure. According to some aspects, an image generator 200 receives an original image including original content at an original resolution.

In various embodiments, the image generator 200 can include a computer system 280 including one or more processors 210, computer memory 220, an object detector 230, a training component 240, a noise component 250, and a diffusion model 260. The computer system 280 of the image generator 200 can be operatively coupled to a display device 290 (e.g., computer screen) for presenting prompts and images to a user 110, and operatively coupled to input devices to receive input from the user, including the original image(s).

According to some aspects, object detector 230 can perform object detection using a computational model that determines where one or more objects are located in an image, where object detection may include the use of bounding boxes and masks. Object detection can include instance segmentation, which detects multiple instances of objects of the same class in an image. In contrast, semantic segmentation identifies regions of an image that belong to the same object class. Semantic segmentation classifies each pixel of an image into one of a set of categories or classes without distinguishing between different instances of the same object class. Image segmentation partitions a digital image into multiple image objects or regions and locates the objects, regions, and boundaries within the image. Image segmentation can be based on the characteristics of the pixels in the image, for example, color, texture, shape, enclosed area, etc.

In various embodiments, the object detector can be an encoder that can be trained to generate an image code for an image.

In various embodiments, the training component 240 can provide a training set of images having different resolutions, and calculate a loss for differences between a ground truth image and a predicted image. The loss can be used to update the diffusion model parameters and/or encoder parameters, so as to generate more accurate output image(s), where the output image(s) can have a different resolution than the input image(s). The input and output images can be represented as a continuous function, where the image(s) can be represented as a set of latent codes distributed in spatial dimensions. The training component 240 can also train an encoder, E, that maps an image to a 2D feature map. A function $f_\varphi$ shared by all the images can be jointly trained.

In various embodiments, the noise component 250 can generate Gaussian noise for the Diffusion Model 260. Gaussian noise is signal noise that has a probability density function (PDF) equal to that of the normal distribution, also referred to as a Gaussian distribution. The Gaussian noise can be added to the image in steps using an additive noise model, for example, a Markov Chain, where the noise is not part of the original image signal. An image can be asymptotically transformed into pure Gaussian noise.

In various embodiments, the diffusion model 260 can be a stable diffusion model, which can be used as the base generative model. The diffusion model can be a generative model that can synthesize an image, I, at high resolution (e.g., 4096×4096 pixels), given a randomly sampled image code, z, that encodes the desired image content. Note that the same hyperparameters (i.e., noise strength, total diffusion steps, sampling schedule, classifier free guidance strength C) can be used. The latent code z can be a high-dimensional vector or a low resolution map, for example, as in Latent Diffusion.

Diffusion models are a class of generative models that convert Gaussian noise into images from a learned data distribution using an iterative denoising process. Diffusion models are also latent variable models with latents, $z=\{z_t | t \in [0, 1]\}$, that obey a forward process $q(z|x)$ starting at data $x \sim p(x)$. This forward process is a Gaussian process that satisfies the Markovian structure. For image generation, the diffusion model is trained to reverse the forward noising process (i.e., denoising, $z_t \sim q(z_t|x)$).

In various embodiments, the computation and parameters in a diffusion model 260 take part in the learned mapping function which reduces noise at each timestep (denoted as F). The model takes as input x (i.e., noisy or partially denoised image depending on the timestep), the timestep t, and conditioning information the model was trained to use. In some cases, the conditioning information can be a text prompt (e.g., TP, " ", and AP are text prompts). Classifier-free guidance is a mechanism to vary and control the influence of the conditioning on the sampled distribution at inference. In some cases, the conditioning can be replaced by the null token (i.e., the empty string, " ", in case of text conditioning) during training. A single scalar can control effect of the conditioning during inference.

According to some aspects, noise component 250 generates a noise map based on the original image, where the output image is generated based on the noise map. In some examples, noise component 250 generates an iterative noise map for each of a set of output images with successively reduced noise to produce the output image.

According to some aspects, diffusion model 260 generates an output image including the original content from the original image, but the output image is at a different resolution than the input image. In some aspects, the output image modifies original content and/or combines additional content in a manner consistent with the original content. In some examples, diffusion model 260 iteratively produces a set of output images.

Figure 3:
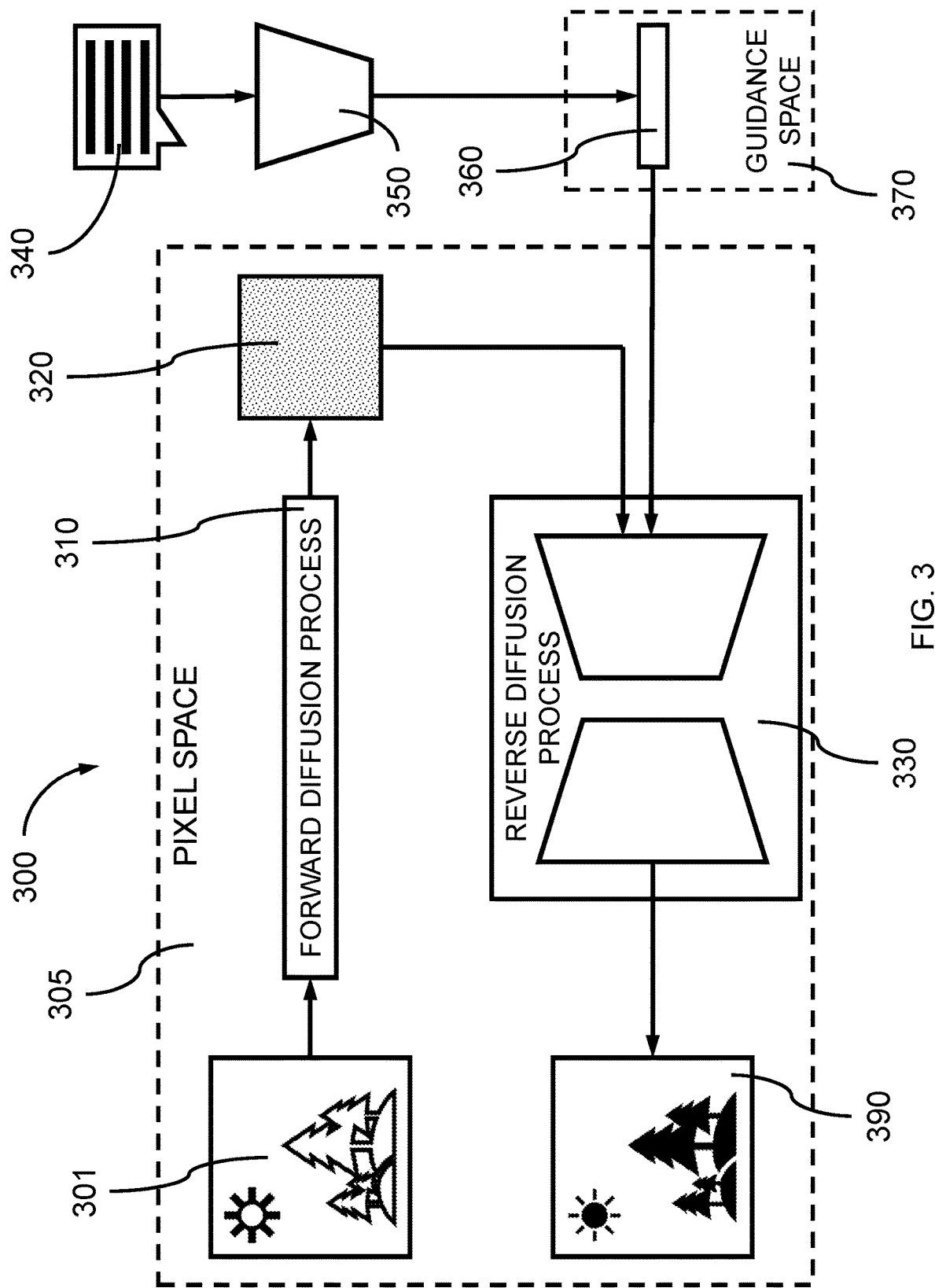
FIG. 3 shows a block diagram of an example of a guided diffusion model 300 according to aspects of the present disclosure.

FIG. 3 shows a block diagram of an example of a guided diffusion model 300 according to aspects of the present disclosure. The guided latent diffusion model 300 depicted in FIG. 3 is an example of, or includes aspects of, the corresponding diffusion model element 260 described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data (e.g., image) during a forward process and then learning to recover the data by denoising the data during a reverse process. For example, during training, guided latent diffusion model 300 may take an original image 301 in a pixel space 305 as input and apply forward diffusion process 310 to gradually add noise to the original image 305 to obtain noisy images 320 at various noise levels.

Next, a reverse diffusion process 330 (e.g., a U-Net Artificial Neural Network (ANN)) gradually removes the noise from the noisy images 320 at the various noise levels to obtain an output image 390. In some cases, an output image 390 is created from each of the various noise levels.

The output image 390 can be compared to the original image 301 to train the reverse diffusion process 330.

The reverse diffusion process 330 can also be guided based on a text prompt or description 340, or another guidance prompt, such as an encoder image code, an image, a layout, a segmentation map, etc. The text prompt 340 can be encoded using a text encoder 350 (e.g., a multimodal encoder) to obtain guidance features 360 in guidance space 370. The guidance features 360 can be combined with the noisy images 320 at one or more layers of the reverse diffusion process 330 to ensure that the output image 390 includes content described by the text prompt 340. For example, guidance features 360 can be combined with the noisy features using a cross-attention block within the reverse diffusion process 330.

Figure 4:
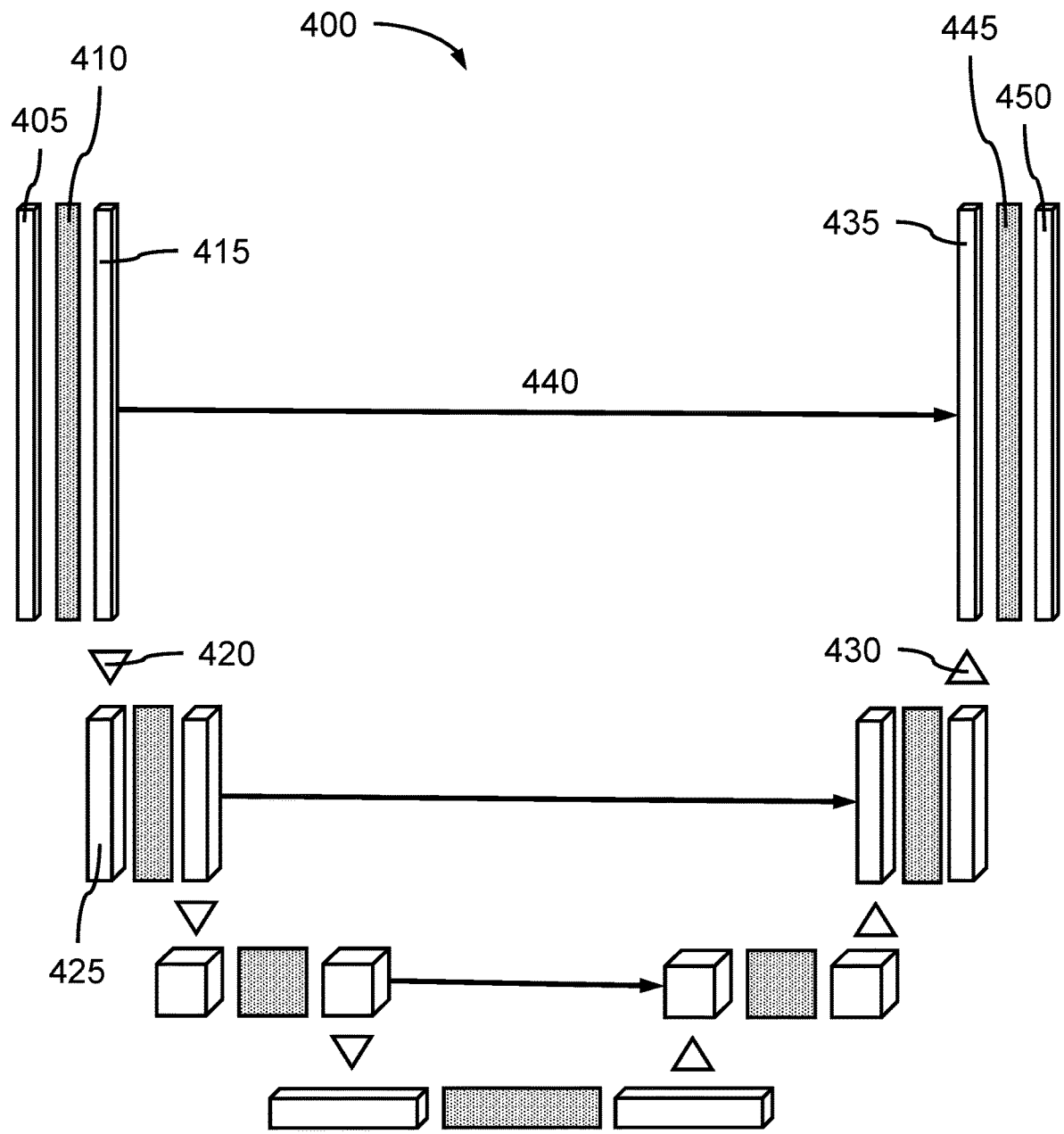
FIG. 4 shows an example of a U-Net 400 according to aspects of the present disclosure.

FIG. 4 shows an example of a U-Net 400 according to aspects of the present disclosure. The U-Net 400 depicted in FIG. 4 is an example of, or includes aspects of, the architecture used within the reverse diffusion process described with reference to FIG. 3.

In some examples, diffusion models are based on a neural network architecture known as a U-Net. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. That is, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Image Generation

Figure 5:
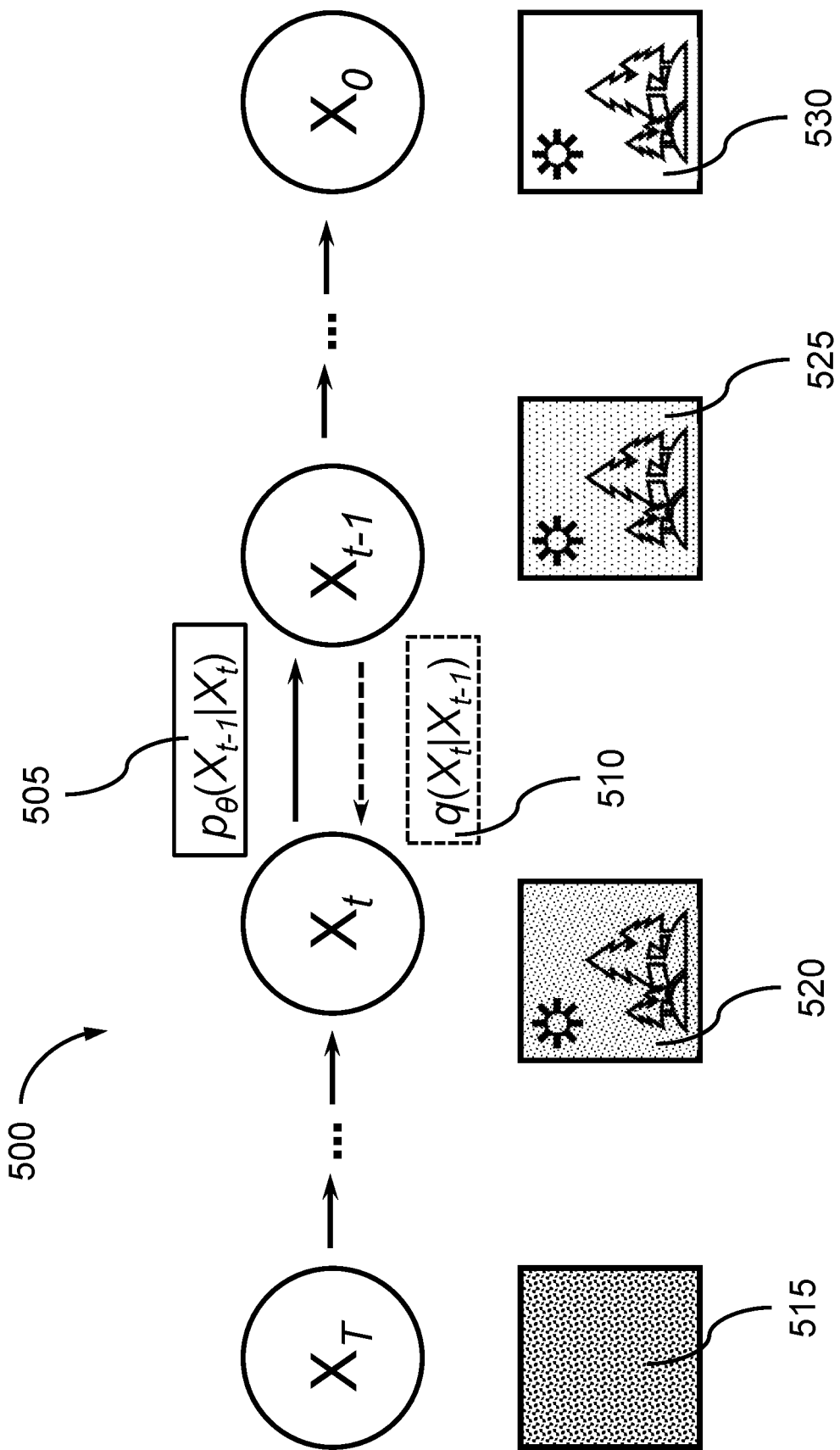
FIG. 5 shows a diffusion process according to aspects of the present disclosure.

FIG. 5 shows a diffusion process according to aspects of the present disclosure. The diffusion process of FIG. 5 can be used to generate digital images, including high resolution images.

As described above with reference to FIG. 3, a diffusion model 300 can include both a forward diffusion process 505 for adding noise to an image (or features in a latent space) and a reverse diffusion process 510 for denoising the images (or features) to obtain a denoised image. The forward diffusion process 505 can be represented as $p_\theta(x_{t-1}|x_t)$, and the reverse diffusion process 510 can be represented as $q(x_t|x_{t-1})$. In some cases, the forward diffusion process 505 is used during training to generate images with successively greater noise, and a neural network (e.g., diffusion model) is trained to perform the reverse diffusion process 510 (i.e., to successively remove the noise).

In an example forward process for a latent diffusion model, the model maps an observed variable $x_0$ (either in a pixel space or a latent space) to intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 510, the model begins with noisy data $x_T$, such as a noisy image 515 and denoises the data to obtain the $p(x_{t-1}|x_t)$. At each step, t−1, the reverse diffusion process 510 takes $x_t$, such as first intermediate image 520, and t as input. Here, t represents a step in the sequence of transitions associated with different noise levels. The reverse diffusion process 510 outputs $x_{t-1}$, such as second intermediate image 525 iteratively until $x_T$ is reverted back to $x_0$, the original image 530. The reverse process can be represented as:

$$p_\theta(x_{t-1}|x_t) := \mathcal{N}(x_{t-1}; \mu_\theta(x_t, t), \Sigma_\theta(x_t, t)). \quad (4)$$

The joint probability of a sequence of samples in the Markov chain can be written as a product of conditionals and the marginal probability:

$$x_T : p_\theta(x_{0:T}) := P(x_T) \Pi_{t=1}^T p_\theta(x_{t-1}|x_t), \quad (5)$$

where $p(x_T) = \mathcal{N}(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_o$ represents an original input image with low image quality, latent variables $x_1, \ldots, x_T$ represent noisy images, and $\tilde{x}$ represents the generated image with high image quality.

Figure 6:
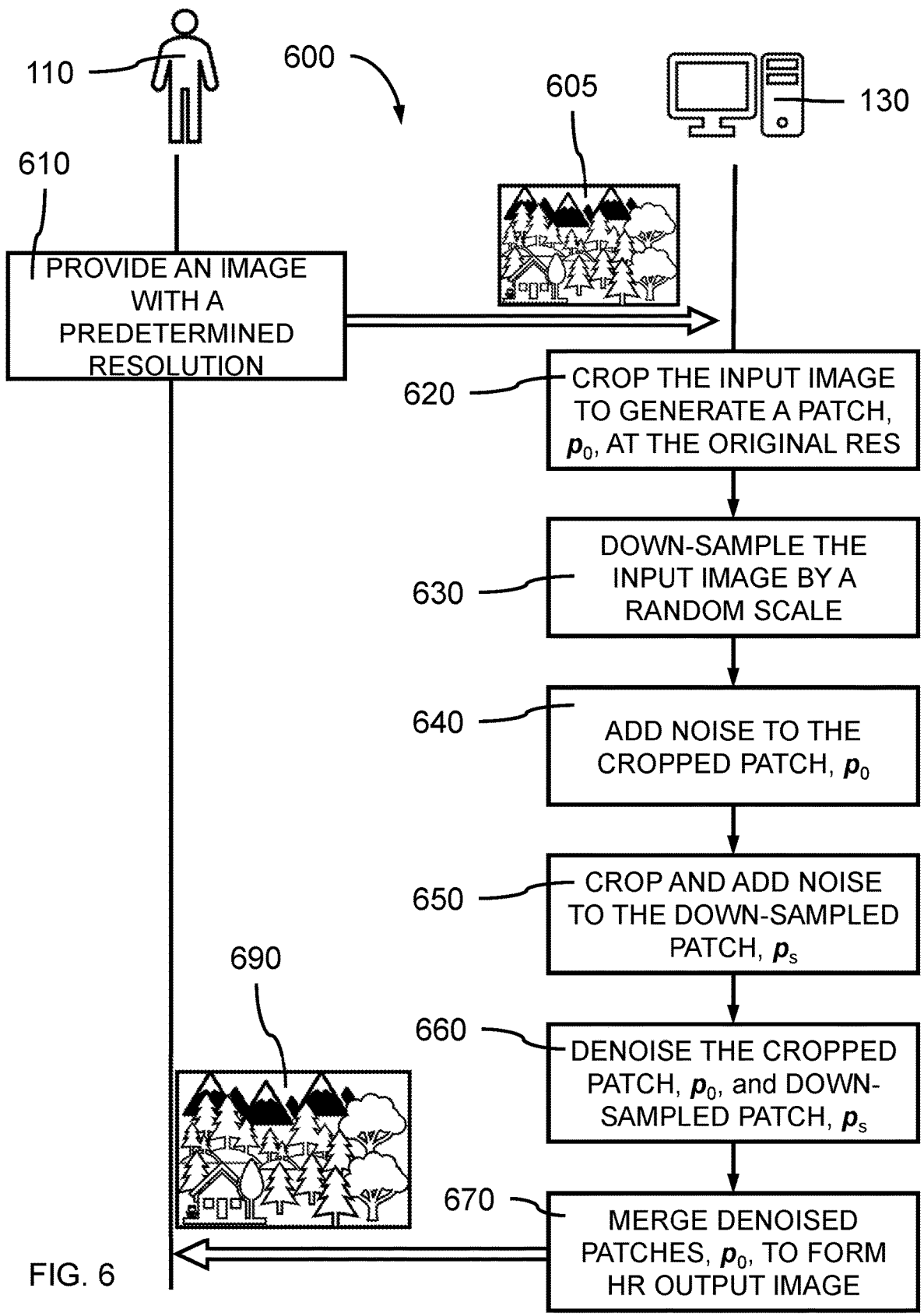
FIG. 6 is an illustrative depiction of a high level diagram of user inputs to an image processing system to perform high resolution image generation using a diffusion model, according to aspects of the present disclosure.

FIG. 6 is an illustrative depiction of a high level diagram of user inputs to an image processing system to perform high resolution image generation using a diffusion model, according to aspects of the present disclosure.

In various embodiments, an image generation process 600 can be performed to modify the resolution of an image, and produce a complete image with a greater resolution.

At operation 610, a user 110 can provide an initial image 605 to an image processing system 130. The image processing system 130 can be configured to generate a global image code, z, from the image 510, identify the objects in the image 510, extract a randomly cropped patch from the image, add noise to the patch, denoise the noisy patch based on local coordinates and image scale using the global content code, z, and generate a new image using conditional information, c, where c can be class-label or text-prompt (if paired data of (c, image) is available for training) and a diffusion model, and fitting the denoised patches together to synthesize a larger (higher resolution) output image.

At operation 620, the input image can be cropped to isolate a local portion of the initial image 605, as a patch, $p_0$, where the patch is at the same resolution as the initial image, and where patch resolution is a constant. For example, the random patches can be of 256×256 pixels. The image and patch can also have an initial scale, s, and patch coordinates, $c_i$. The patch scale, s, is the ratio of the patch resolution to the image resolution. A coordinate map, C, can specify the patch coordinates, $c_i$, of spatial locations in the image 605, where $C = \{c_1, \ldots c_i, \ldots, c_N\}$, and N is the number of patches that the initial image 605 is divided into. In various embodiments, patch coordinates, $c_i$, can identify reference points of the patches, $p_O$, for example, an upper left reference point (e.g., pixel) or lower left reference point. The global code z specifies a layout, the coordinates specify where a current patch is from the layout (so that the model knows what to generate in a local patch).

At operation 630, the initial image 605 can be down-sampled to generate a lower resolution image, where the initial image 605 can be down-sampled by a random scale.

At operation 640, Gaussian noise can be generated, for example, by a noise component 250, and the noise can be added to the patch, $p_O$, having the original resolution.

At operation 650, the lower resolution, down-sampled image can be cropped, and noise added to the down-sampled patch, $p_s$.

At operation 660, the cropped patch, $p_O$, and the down-sampled patch, $p_s$, can each be denoised, for example, using a trained diffusion model.

At operation 670, a diffusion model can generate a complete image 690, and provide the completed image back to the user 110. The diffusion model can generate the complete image 690 from the patches, $p_O$, based on the original image 605 and a global image code, z, where the trained diffusion model can synthesize an image, I, at high resolution (e.g. 1920×1080 pixels, 2560×1440 pixels, 3840× 2160 (4K UHD), 4096×4096 pixels). The high resolution image 690 can be displayed to the user 110 on a computer screen.

Figure 7:
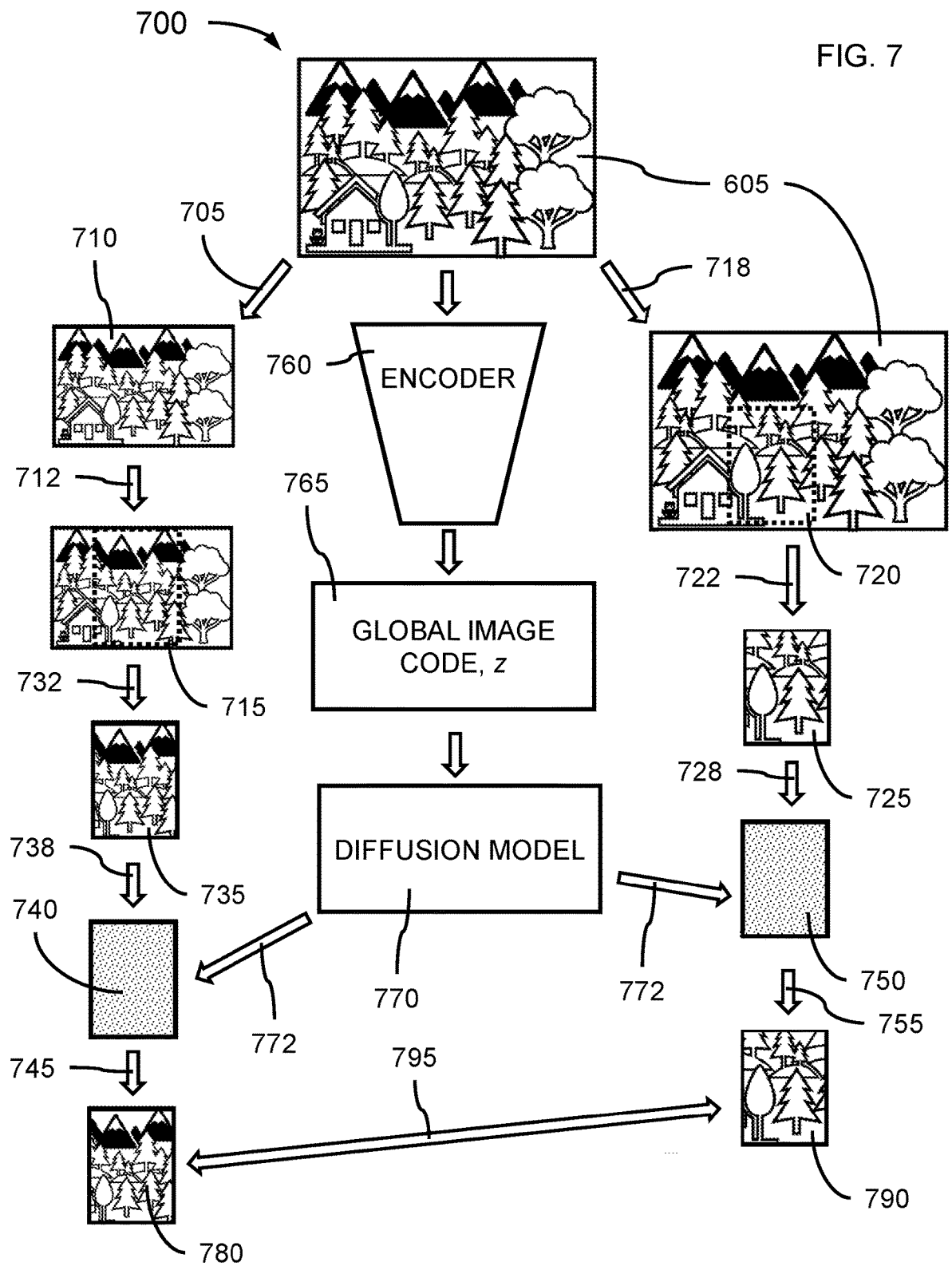
FIG. 7 is an illustrative depiction of a diagram of an image processing system to perform consistent multiscale patch diffusion with a diffusion model, according to aspects of the present disclosure.

FIG. 7 is an illustrative depiction of a diagram of an image processing system to perform consistent multiscale patch diffusion with a diffusion model, according to aspects of the present disclosure. The image processing system can implement a method 700 of producing high resolution images using a diffusion model.

In various embodiments, an initial image 605 can be identified by an image processing system 130. The image processing system 130 can include an encoder 760 for generating a global image code, z, 765 and a diffusion model 770 for generating image patches and images of continuous resolution and scale. In various embodiments, the image can be divided into fragments, for example, patches of a predetermined size and resolution having a coordinate relating to as location in the original image.

In various embodiments, the initial image 605 can be down-sampled 705 to produce a lower resolution image 710 of the initial image 605. The lower resolution image 710 can have a predetermined resolution based on the extent of down-sampling utilized, or have a random scale. This can allow the encoder 760 and a diffusion model 770 to receive and be trained with input images of varying sizes and resolutions by down-sampling each input image to a fixed resolution receivable by the encoder 760 of the image processing system.

In various embodiments, the down-sampled, lower resolution image, $I_s$, 710 can be cropped 712 to identify a patch, $p_s$, 715 of the lower resolution image 710. The patch 715 of the lower resolution image, $I_s$, 710 can be of a similar region of the initial image 605 as a patch, $p_O$, of the initial image 605.

In various embodiments, the higher resolution, initial image, $I_O$, 605 can be cropped 718 to identify a patch, $p_O$, 720 of the higher resolution image 605. The patch, $p_O$, 720 of the higher resolution image, $I_O$, 605 can be of a similar region as a patch, $p_s$, of the lower resolution image 710.

In various embodiments, the patch, $p_s$, 715 of the lower resolution image 710 can be extracted 732 from the lower resolution image 710, as extracted patch, $p_{es}$, 735, for separate processing.

In various embodiments, the patch, $p_O$, 720 of the higher resolution image, $I_O$, 605 can be extracted 722 from the higher resolution image, $I_O$, 605, as extracted patch, $p_{eO}$, 725, for separate processing. The patches 715, 720 can have, for example, a size of 128×128 pixels.

In various embodiments, a diffusion model 770 can add noise to the extracted patch, $p_{es}$, 735 and extracted patch, $p_{eO}$, 725 to generate noisy patches 740, 750 through the noising process 738, 728, respectively, using a forward diffusion process. A large white noise map, $M_f$, with the same resolution as the image, $I_O$, 605 can be used for the noising operation.

In various embodiments, the image processing system 130 can include an encoder 760 that can be configured and trained to generate an embedding of the initial image 605 that captures the image identity and summarizes the image content, as a global image code, z. The global image code, z, 765 can represent a patch of an image, where the global image code can be created for each small patch of the image. The global image code, z, 765 can be computed by the encoder 760 from the corresponding lower resolution image 710, where the lower resolution image(s) 710 can have a fixed resolution resulting from the down-sampling. The encoder 760 can be an autoencoder that provides a lower-dimensional representational space that is perceptually equivalent to the data space of the images (e.g., Latent Diffusion Model (LDM)). The global image code, z, is generated by encoding a fixed low-resolution global image, where the global image code, z, can represent the local patch information when decoding it with specified local coordinates.

In various embodiments, given an image in RGB pixel space, the encoder, E, 760 encodes the image 605 into a latent representation, global image code, z, 765 that can have a two-dimensional structure that can capture a latent structure of z, retaining semantic bits of the data while abstracting away high-frequency, imperceptible details. A decoder, D, can reconstruct the image from the global image code, z.

In various embodiments, the encoder 760 can be scale-agnostic, such that the encoder 760 processes a small fixed-sized proxy, a patch, of a training image. The encoder 760 can down-sample the image by a factor, $f$, where whatever the input resolution is (e.g. 256~1024 pixels), the encoder 760 can down-sample the input to the same resolution (e.g., 256) and then process it with the network (the network has a down-sampling factor, $f$).

In various embodiments, the global image code, z, 765 can contain information about the image layout in the continuous spatial domain, irrespective of the actual resolution the image is synthesize at, where the global image code, z, can be a high-dimensional vector or a low resolution map. The global image code, z, 765 can be easy to sample during inference, where a Gaussian prior can be imposed on the global image code, z, using a KL divergence loss, as with a Variational Autoencoder, or by formulating the global image code, z, as another diffusion model that operates at a low-resolution (e.g., Latent Diffusion Model). The present method may apply either approach.

In various embodiments, the global image code, z, 765 can be a 2 dimensional (2D) map. In various embodiments, a neural network can up-sample global image code, z, 765 into a spatial feature map z' with higher resolution. When global image code, z, 765 is used as one of the inputs for generating local patches, a decoder can map the feature map, z, to a higher-resolution feature map z', and then pass z' to a patch generation network.

In various embodiments, a diffusion model 770 can denoise 745, 755 noisy patches 740, 750 that were generated from the extracted low resolution patch, $p_{es}$, 735 and extracted high resolution patch, $p_{eO}$, 725 to generate denoised patches 780, 790, respectively. The denoised patches 780, 790 can be of the same portion of the initial image, $I_O$, 605, such that the denoised low resolution patch, $p_{ds}$, and the denoised high resolution patch, $p_{dO}$, can be directly compared 795 to determine a patch consistency loss. Consistency of outputs between scale can be encouraged by sampling two patches during training at varying locations and scales and minimizing the difference between the model's outputs on the area where the patches overlap.

In various embodiments, the global image code, z, 765 can be utilized by the diffusion model 770 to denoise the noisy patches 740, 750, where the diffusion model 770 can be conditioned on the global image code, z, 765, an image scale, s, and a local patch coordinate, $c_i$. Denoising the noisy patches 740, 750 can generate a conditionally denoised high resolution patch, $p_{dO}$, 790, conditioned 772 on a global image code, z, image scale, s, and local patch coordinates, $c_i$. The diffusion model 770 can generate a final high resolution image, $I_F$, 690 one patch at a time.

In various embodiments, the diffusion model 770 can already be trained in pixel space. Diffusion Models are probabilistic models designed to learn a data distribution p(x) by gradually denoising a normally distributed variable, which corresponds to learning the reverse process of a fixed Markov Chain of length, T.

Figure 8:
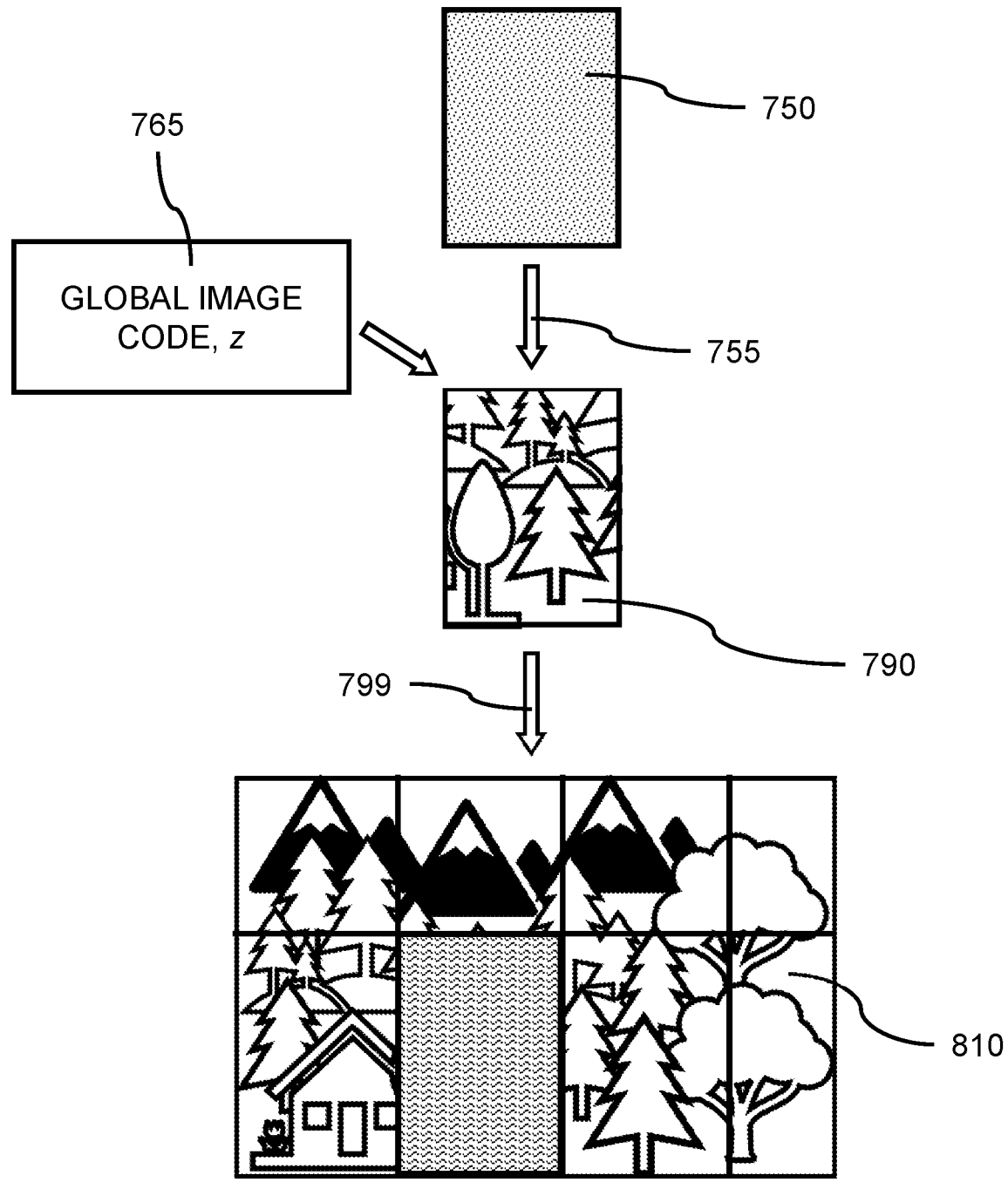
FIG. 8 is an illustrative depiction of a method of inference with patch based synthesis, according to aspects of the present disclosure.

FIG. 8 is an illustrative depiction of a method of inference with patch-based synthesis, according to aspects of the present disclosure. A large high resolution image, that can be noisy, can be fragmented into a plurality of overlapping patches; the patches can be processed using a conditional local diffusion model, and denoised patches can be assembled back into an image.

In various embodiments, a noisy patch 750 of the extracted high resolution patch, $p_{eO}$, 725 can be denoised 755 by the diffusion model 770 based on the global image code, z, 765, an image scale, s, and a local patch coordinate, $c_i$. Denoising the noisy patch 750 can generate a conditionally denoised high resolution patch, $p_{dO}$, 790. To avoid discontinuities between neighboring patches, the inputted noisy patches 750 can be padded on each side by a fixed number of pixels that depends on the diffusion model's denoiser's receptive field.

In a diffusion model, image generation is done by starting from a Gaussian noise map and iteratively "denoising it" for many steps, such that at each iteration there is a "current noisy image". FIG. 8 illustrates a single iteration of the denoising steps, where the input patch is the patch from the "current noisy image", that is, after the patches have been merged, and one iteration in the diffusion denoising steps has been completed.

In various embodiments, a large white noise map, $I_O$, with the same resolution as I, can be sampled. The large white noise map, $I_O$, map can be denoised (score estimation) with T=100 steps of a patch-based diffusion process. Let $I_t$ be the denoised image at time step t=1, ..., T. The algorithm can iteratively denoise the noisy image, $I_t$, by processing it one patch at a time, and assembling the output patches back into a large image.

In various embodiments, the noisy patch 750 can be denoised (score estimation) with T=100 steps of a patch-based diffusion process. The denoising process can be repeated for a plurality of noisy patch 750 generated from patches, $p_O$, 720 of the initial image 605.

The assembly function can be represented by:

$$It+1 = \text{AssemblePatches}(G(\text{SplitPatches}(It)i; z, ci, s));$$

where distribution produces a set of patches indexed by i from an image, $c_i$ is the corresponding patch coordinate relative to the initial image 605, and s is the global image scale (relative to the patch resolution). AssemblePatches stitches the patches together back into a final image, where the final synthesized image is $I_F = I_T$.

In various embodiments, the diffusion model 770 can merge 799 the plurality of conditionally denoised high resolution patches, $p_{dO}$, 790 into a final high resolution image, $I_F$, 810 one patch at a time. Starting from a pure noise image, the diffusion model, G, iterates T diffusion steps. The denoised high resolution patch, $p_{dO}$, 790 can be assembled into the final high resolution image, $I_F$, 810 in a seamless manner by padding the patches with boundary pixels on each of the sides. A patch-wise diffusion model, $G(\text{patch}_i; z, c_i, s)$, can be conditioned on the patch coordinates and image scale, so that the diffusion model is aware of where the patch being synthesized fits within the larger image, and can ensure the image is globally consistent despite the diffusion model processing a local portion of the full image one patch at a time. This model can also synthesize the image at the final, high-resolution without up-sampling a low resolution image, thereby making the process more computationally efficient.

In various embodiments, an image with scale, s, can be selected at random from a dataset, and a fixed-resolution patch, $p_O$, can be cropped from the image at a random location, $c_i$. The image scale, s, is measured as the ratio of the patch resolution, $R_p$, to the image resolution, $R_I$.

Figure 9:
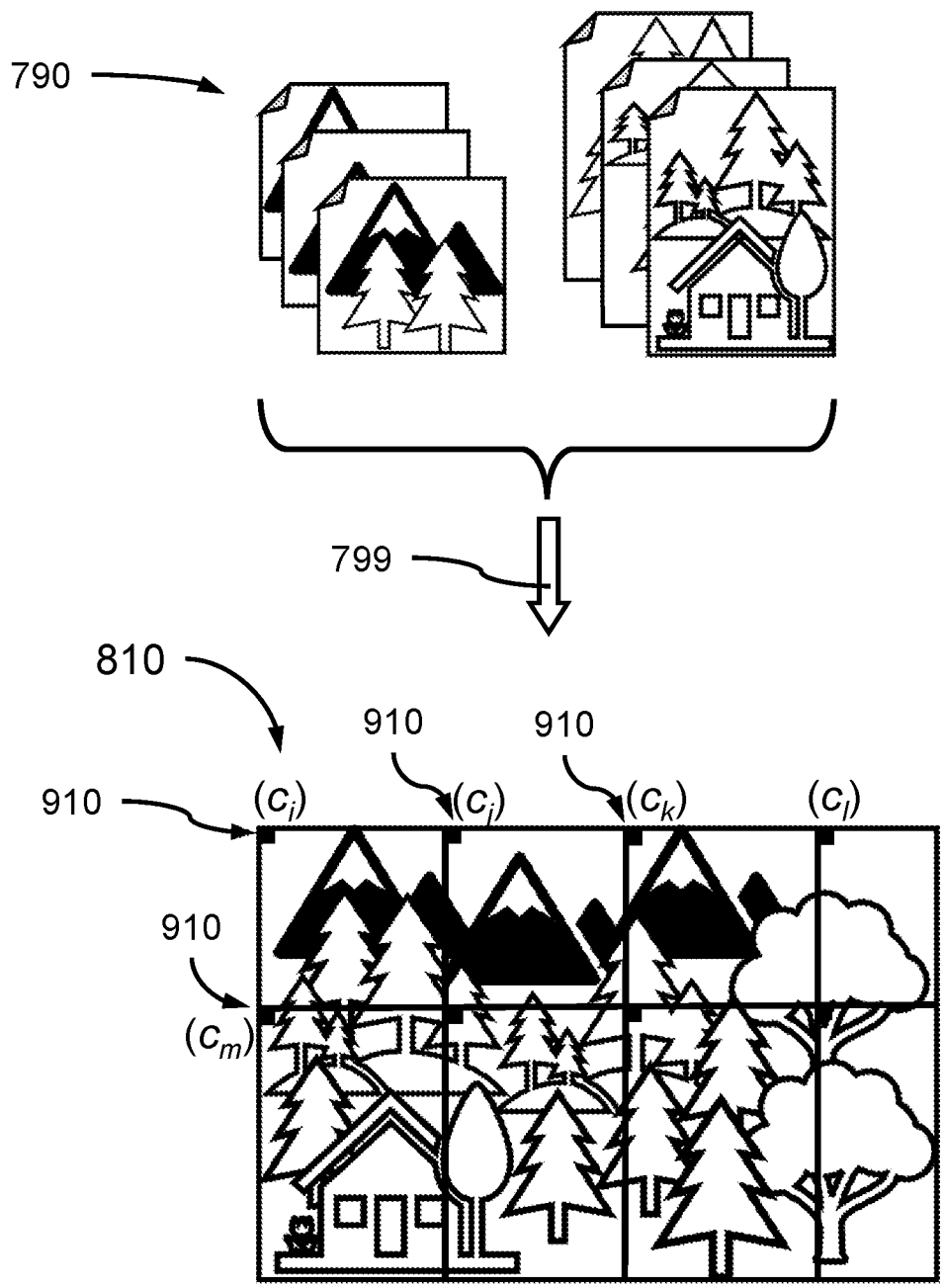
FIG. 9 is an illustrative depiction of a patch assembly operation to generate a full-sized output image, according to aspects of the present disclosure.

FIG. 9 is an illustrative depiction of a patch assembly operation to generate a full-sized output image, according to aspects of the present disclosure.

In various embodiments, a plurality of denoised high resolution patches 790 can be assembled 799 into the final high resolution image, $I_F$, 810. The denoised patches 790 can be positioned based on the local patch coordinates, $c_i$, 910, where a coordinate map, C, specifies spatial locations in the final high resolution image, $I_F$, 810, where the image can be of a higher resolution than the initial image, $I_O$. AssemblePatches stitches the patches together back into the image. The spatial coordinates, $c_i$, and global image code, z, can ensure the patches generated by the diffusion model can be assembled in a globally consistent manner, but do not guarantee perfect consistency across scales, s, due to different s and different noise map, Mr. To mitigate this, a cross-scale consistency term can be used during training.

Training

Figure 10:
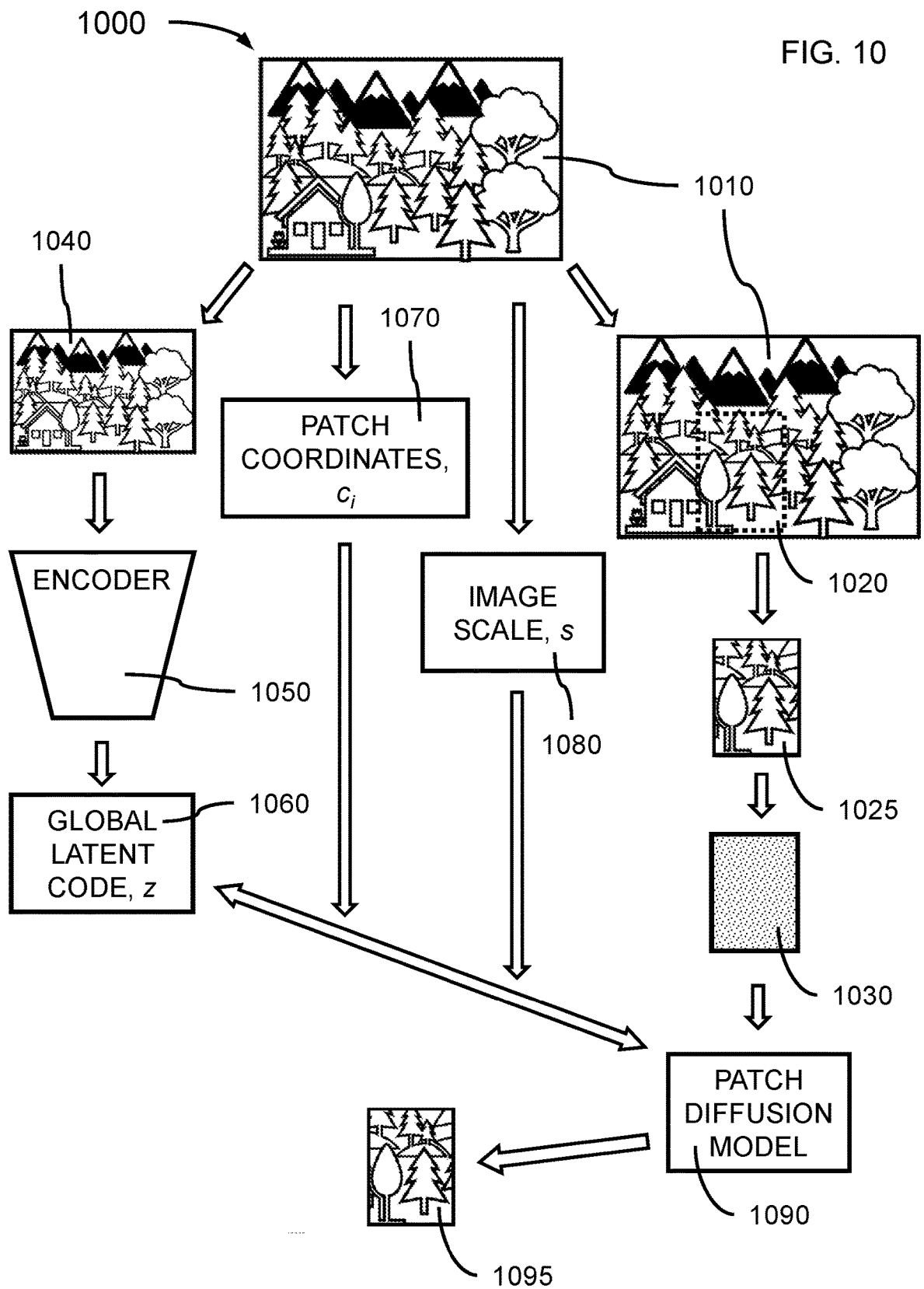
FIG. 10 is an illustrative depiction of model training using low resolution ground truth images, according to aspects of the present disclosure.

FIG. 10 is an illustrative depiction of model training using low resolution ground truth images, according to aspects of the present disclosure.

In various embodiments, the model can have two trainable components, where the first component is a denoising diffusion model that learns to generate image patches from patches of noise, given conditioning variables z (global content code), $c_i$ (patch coordinates), and s (full-resolution image scale), and the second is an encoder that learns to map a low-resolution version of the high-resolution training image into the global image code, z. The two components can be trained separately, or jointly for optimal quality.

In various embodiments, for a model training method 1000 the diffusion model is a fixed-resolution, patch-wise diffusion model, G, 1090, where the diffusion model processes a local portion of the full image 1010 at a time. To train the diffusion model 1090, high resolution training images 1010 with varying scale, s, can be randomly sampled from a dataset. The high resolution training images 1010 can include ground truths for calculating a loss function from the predicted images. For example: $\mathcal{L}(G(p_t), p_0)$ In various embodiments, during the training method 1000, a mixed-resolution dataset (e.g., collected by a human) can be used for training. During training, a global image code, z, is inferred from fixed low resolution image(s). The diffusion model can be trained with input images at any resolution, and can also output images at any resolution, including and going beyond 1024 pixels, through a single training stage. Another diffusion generative model can be trained for generating a global image code, z, where every training image corresponds to its own z code, or the global image code, z, can be made to follow a simple distribution such as Gaussian. A diffusion model, that can generate high-resolution images, can be trained by building the images one small image patch at a time.

In various embodiments, a random patch, $p_{c0}$, 1020 can be cropped at a random location, $c_i$, from the high resolution training image 1010. The cropped patches $p_{c0}$, 1020 can all be the same resolution, e.g. 256×256 pixels. Since patch resolution is a constant, the definition of scale (image-resolution/patch-resolution) is equivalent to the resolution (height or width), where the image contains an object of interest, and where a larger scale contains more detail of the object.

In various embodiments, noise can be added to the cropped patch, $p_{c0}$, 1025 to create a noisy training patch, $p_t$, 1030. The noise can be added to the cropped patch, $p_{c0}$, 1025 by a diffusion model.

In various embodiments, noisy training patch, $p_t$, 1030 can be provided to the patch-wise diffusion model, G, 1090, where the diffusion model, G, 1090 can denoise the noisy training patch, $p_t$, 1030 conditioned on local coordinates, $c_i$, 1070 image scale, s, 1080 and global content code, z., to produce a predicted image patch, $p_p$, 1095. The local coordinates, $c_i$, 1070 image scale, s, 1080 can be obtained from the high resolution training image 1010.

In various embodiments, a low-resolution copy, $I_c$, 1040 of the ground-truth image can be generated through down-sampling. The encoder 1050 can receive the low-resolution copy, $I_c$, 1040 of the ground-truth image, and generate a global image code, z, 1060. The global image code, z, can be computed by the encoder 1050 from the corresponding global image 1010 down-sampled to a fixed low-resolution copy, $I_c$, 1040. Global image code, z, 1060 can be tractable, descriptive, and easy to sample during inference by imposing a Gaussian prior on code z using a KL divergence loss, or by formulating the latent space z as another diffusion model.

At test-time the encoder 1060 is discarded and the global image code, z, sampled directly from a tractable distribution. At test-time the model is a generative model, which can first generate a global image code, z, from the previously learned distribution without requiring additional input. The model can then generate patches and merge them, such that the encoder 1060 is not used in application at test time.

In various embodiments, to condition the diffusion model on global image code, z, a neural network (e.g., a decoder) that up-samples z into a spatial feature map z' with higher resolution can be used. To generate a patch, the nearest feature vectors from z' at the coordinates corresponding to the patch's pixels can be selected. This information is concatenated with the input patch, $p_t$, as additional channels and passed into the diffusion model. The local diffusion model can follow these guidance channels to generate correct, globally-consistent local patches. Other conditioning mechanisms (e.g., attention) can also work.

In various embodiments, for example, a global image code, z, (D×64×64) is up-sampled by a decoder to z' (D×256×256), where the up-sampled code, z', represents the global image, and z' is viewed as a 256×256 feature vectors evenly distributed at the 2D square of image. If P denotes the patch to denoise, and c,s (coordinate, scale) are the P-corresponding 2D map of query points, q, in the global image, then each of the query points, q, will find in z' for their nearest feature vector, f, and the relative coordinate, r, from f to q. After this, each query point in the 2D map will get (f, r, s), we concatenate (f, r, s) to the corresponding pixel of P (the shape of P is originally 3×256×256, which now becomes P' (3+dim(f)+dim(r)+dim(s))×256×256), the network then takes P' as the input to generate the denoised patch. In this way, information of z,c,s is provided for the denoising of P.

In various embodiments, a cross-scale consistency term can be used during training to reduce or avoid inconsistencies across scales, s, where small details can vary if one tries to generate the same image (i.e, same z) at different resolutions.

Figure 11:
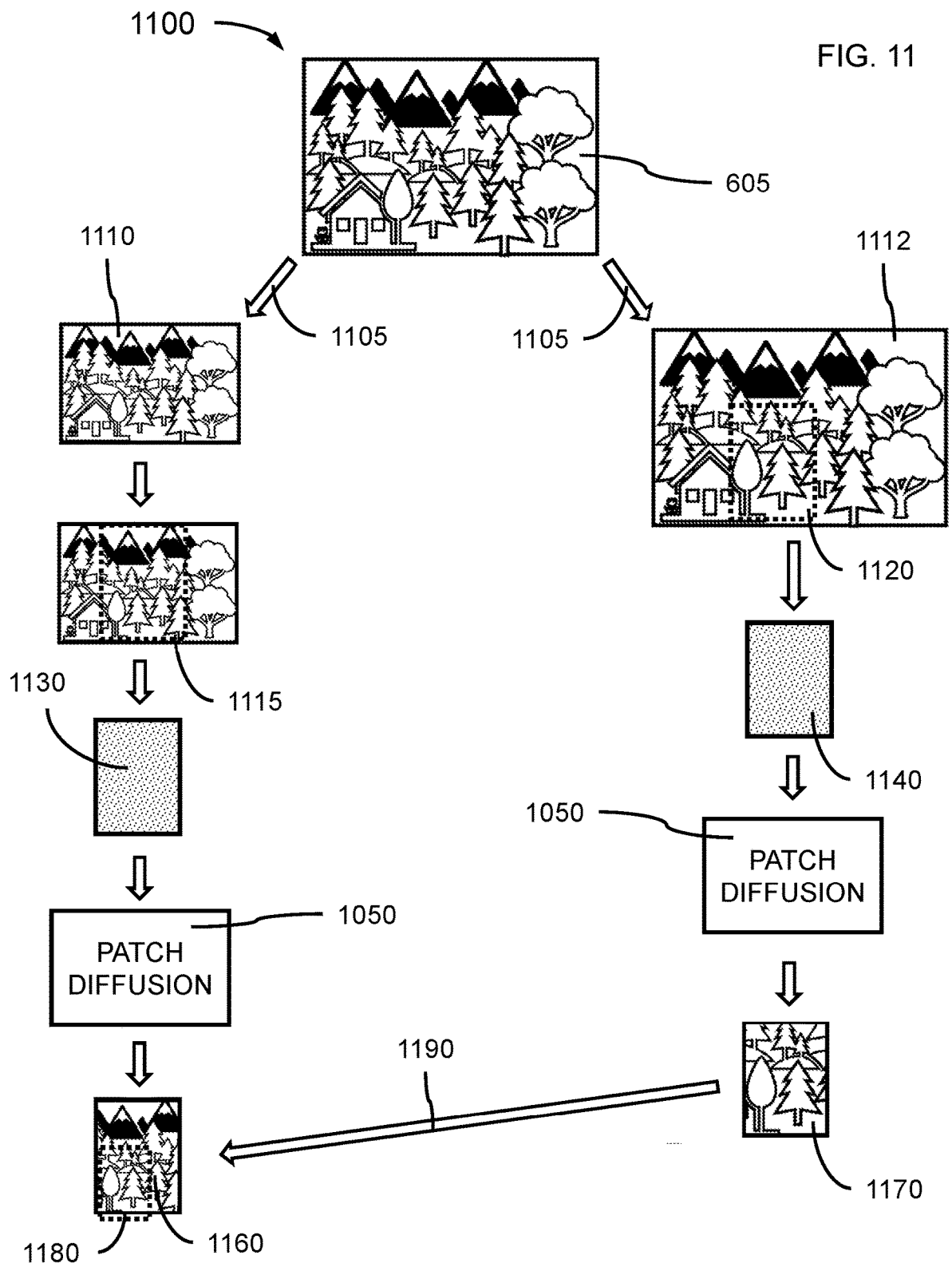
FIG. 11 shows a flow diagram of a method for cross-scale consistency loss, according to aspects of the present disclosure.

FIG. 11 shows a flow diagram of a method for cross-scale consistency loss, according to aspects of the present disclosure. The method 1100 can encourage consistency of outputs between scale by sampling two patches during training at varying locations and scales and minimizing the difference between the model's outputs on the area where the patches overlap.

In various embodiments, for the same initial image, $I_0$, 605, two copies of the image can be produced, where each copy 1110, 1112 can be down-sampled 1105 at random scales s and s', and patches $p_{s0}$ 1115 and $p_{s'0}$ 1120 selected from each down-sampled copy 1110, 1112. The patches $p_{s0}$ 1115 and $p_{s'0}$ 1120 can have noise applied to form noisy patches $p_{st}$ 1130 and $p_{s't}$ 1140, and denoised through patch diffusion 1150. The patches can be denoised conditioned on local coordinates $c_i$, image scale s and global content code z using a local diffusion model, G. The denoised output patches 1160, 1170 can be encouraged to agree on the area where the patches overlap 1180, where this can be after down-sampling the patch in the larger image to match the resolution of the smaller one.

In various embodiments, the denoised output patch 1170 from the down sampled image 1112 can be down-sampled and aligned to the denoised output patch 1160 previously down-sampled at a different scale, so the denoised output patch 1170 and denoised output patch 1160 match and can be aligned and compared 1190:

$$\mathbb{E}\left(\|G(p_t^s;z,c_i^s,s) - G(p_t^{s'};z,c_j^{s'},s')\|^2 \cdot M(c_i^s, c_j^s)\right);$$

where the expectation, $\mathbb{E}$, is over pixels of the two patches, and $M(c_i^s, c_j^s)$ is a binary mask that is 1 if the patches overlap and 0 otherwise. The difference between the model's outputs can be minimizing for the area where the patches overlap.

In various embodiments, the training objects are a diffusion denoising score-matching objective between the denoised patch, $p_{dn}$, and the ground truth patch, $p_0$, given by:

$$\mathcal{L}(G(p_t), p_0)$$

The model can be efficient to train, because a full high-resolution image is not synthesized. It is sufficient to generate patches during training, where the patches are generated at a fixed resolution, unlike an up-sampling-based approach that involves fully generating large images at training time.

Figure 12:
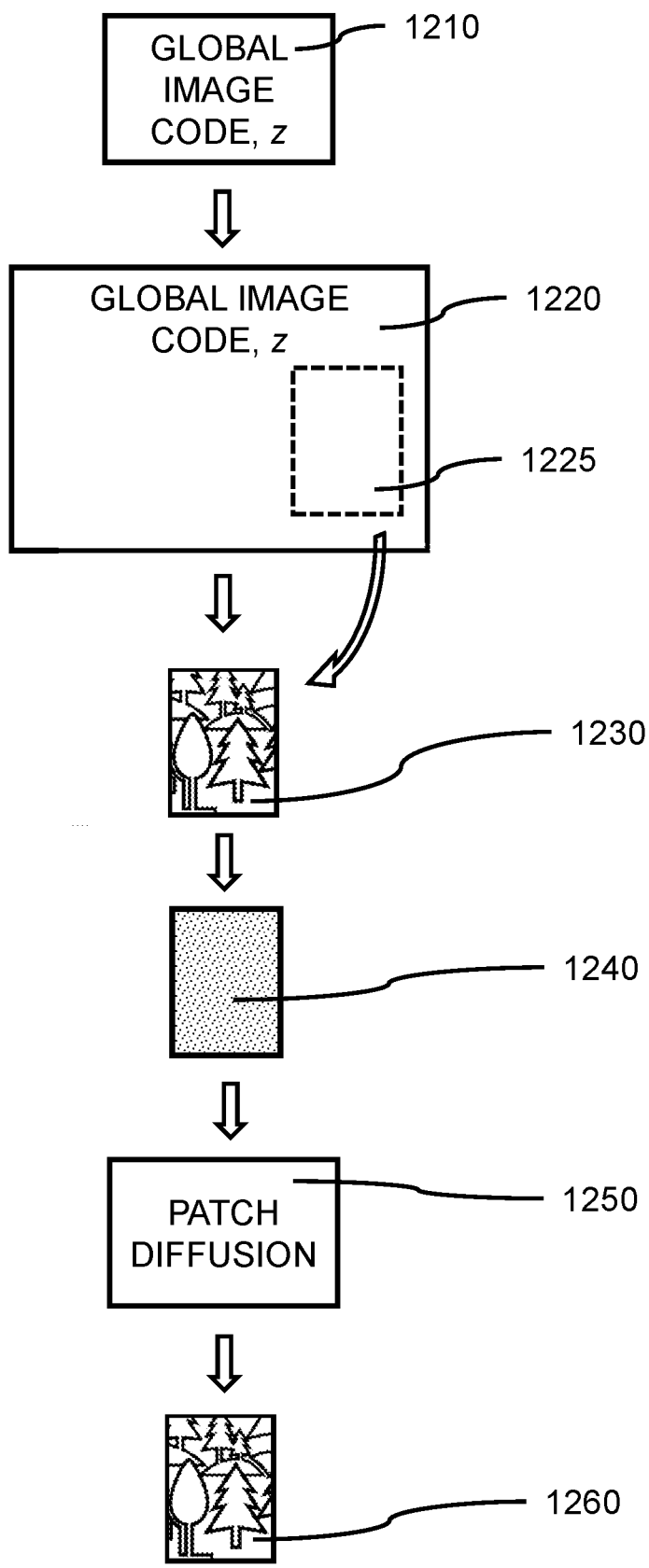
FIG. 12 shows a conditioning mechanism, according to aspects of the present disclosure.

FIG. 12 shows a conditioning mechanism, according to aspects of the present disclosure.

In various embodiments, the global latent code 1210 can be up-sampled through an up-sampling network, to generate an intermediate feature map, z', 1220. A portion 1225 of the intermediate feature map, z', 1220 can be sampled using a nearest neighbor algorithm to produce sampled features 1230, where a noisy patch 1240 can be generated from the sampled features 1230. The noisy patch 1240 can be input to a patch-based diffusion model 1250 to generate a denoised patch 1260.

Figure 13:
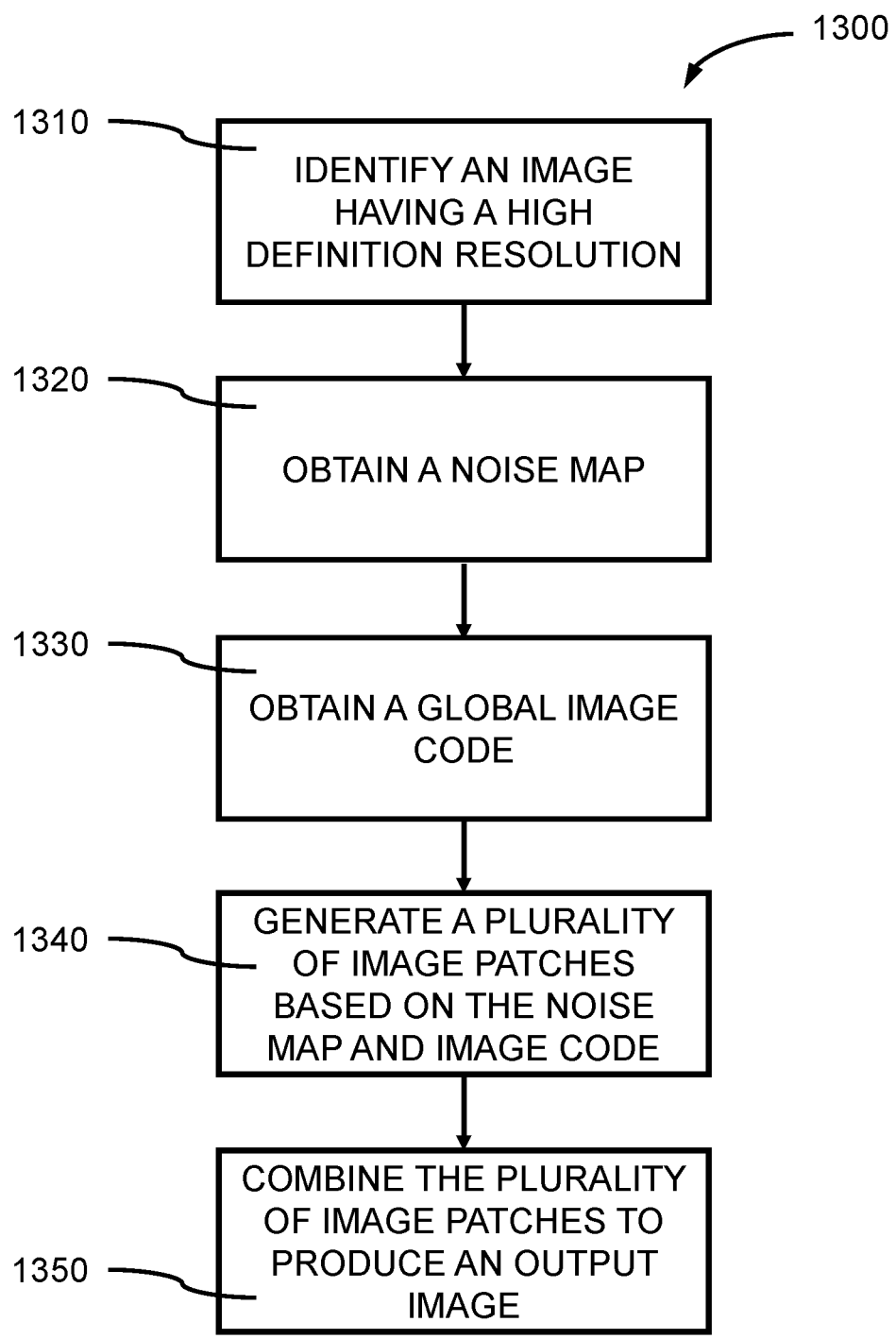
FIG. 13 shows a flow diagram for a method of generating a high resolution image using a diffusion model, according to aspects of the present disclosure.

FIG. 13 shows a flow diagram for a method of generating a high resolution image using a diffusion model, according to aspects of the present disclosure. The method of generating a high resolution image 1300 can use a diffusion model and a set of conditional information, including a global image code.

At operation 1310, an image having a high definition resolution can be identified.

At operation 1320, a noise map can be obtained, where the noise map may be generated by a noise component.

At operation 1330, a global image code representing semantic content of the image can be obtained. The global image code can be generated by an encoder.

At operation 1340, a plurality of image patches can be generated based on the noise map and the global image code using a diffusion model. In some cases, multiple noise patches corresponding to the plurality of image patches are obtained from the same noise map. The noise patches may have a large size than the image patches such that overlapping regions of the noise patches causes the image patches to be generated in a way such that the sides of the images are consistent (because neighboring points are generated based on the same surrounding noise patterns.

At operation 1350, the plurality of image patches can be combined to produce an output image including the semantic content, where the output image can be a final image with higher resolution than an original input image.

Figure 14:
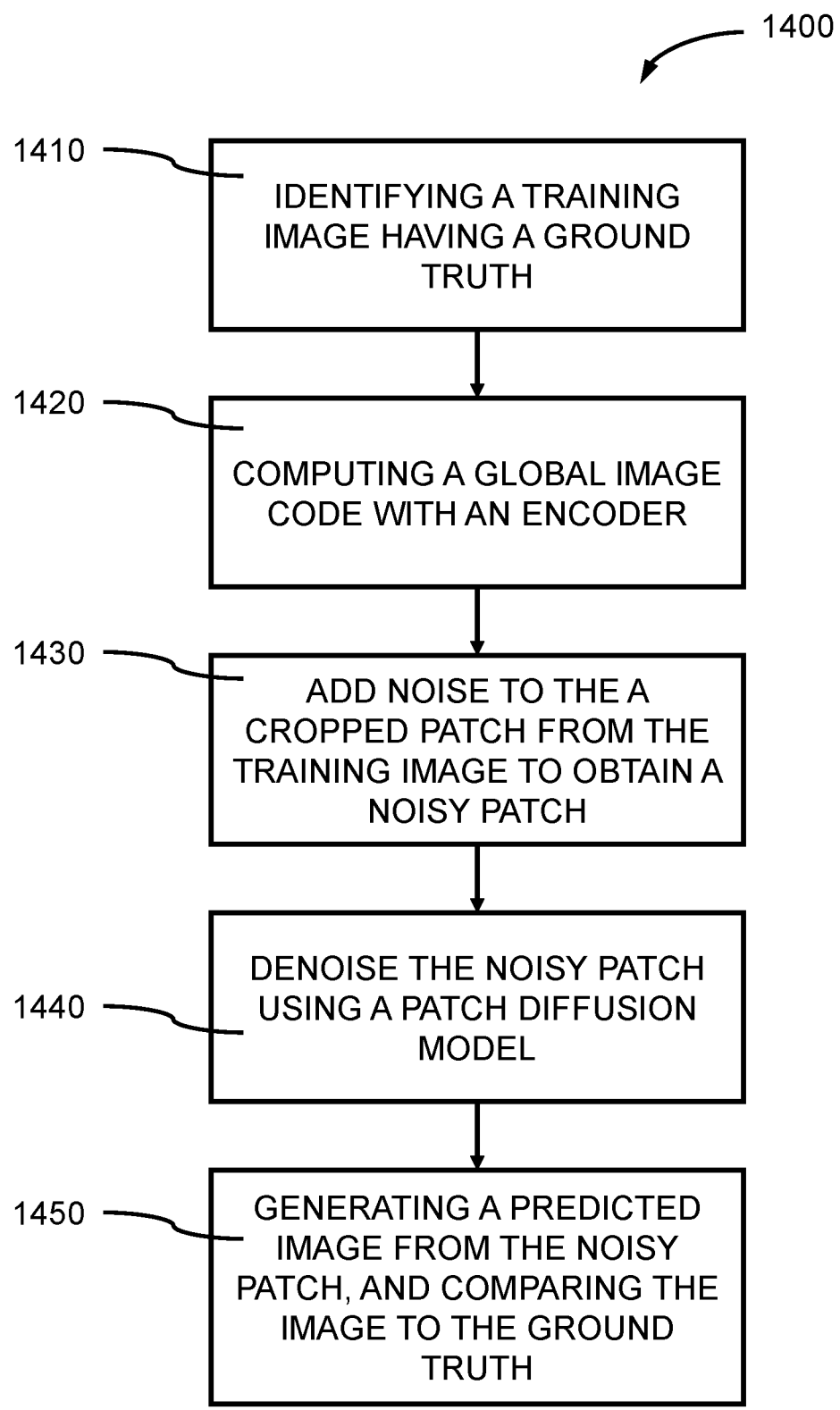
FIG. 14 shows a flow diagram for a method of training a diffusion model, according to aspects of the present disclosure.

FIG. 14 shows a flow diagram for a method of training a diffusion model, according to aspects of the present disclosure.

A neural network including a diffusion model can be trained through supervised learning. The neural network training method 1400 can involve adjusting parameters of the diffusion models, encoders, decoders, transformers, and other deep neural networks, based on error scores between ground truth images and generated images at varying scale and resolution.

At operation 1410, a training image can be identified, where the training image includes at least one object. A training dataset can include a plurality of high-resolution training images of variable sizes. The training image(s) can include a ground truth, where the ground truth indicates an image with a predefined resolution and scale. For unconditional generation (e.g. face generator), the training set can include unlabeled images, which can be at any resolution. For conditional generation, for example, a class-label can be applied to the image, or a text prompt can be applied to the image, where $L_c$ can denote the class-label and/or text prompt. The training set can be pairs of ($L_c$, image), i.e. a labeled image set.

At operation 1320, a global image code, z, is computed by an encoder, E, from the corresponding global image downsampled to a fixed resolution.

At operation 1430, noise can be added to the cropped patch, $p_0$, from the training image to obtain a noisy patch, $p_t$.

At operation 1440, the noisy patch, $p_t$, can be denoised using a patch diffusion model, G, to generate a denoised patch, $p_{dn}$.

At operation 1450, a predicted image can be generated from the noisy patch, where the predicted image can be compared to the ground truth. A loss function can be calculated based on the comparison, and the parameters of the patch diffusion model, G, can be updated to reduce the loss and improve the quality of the predicted images.

Figure 15:
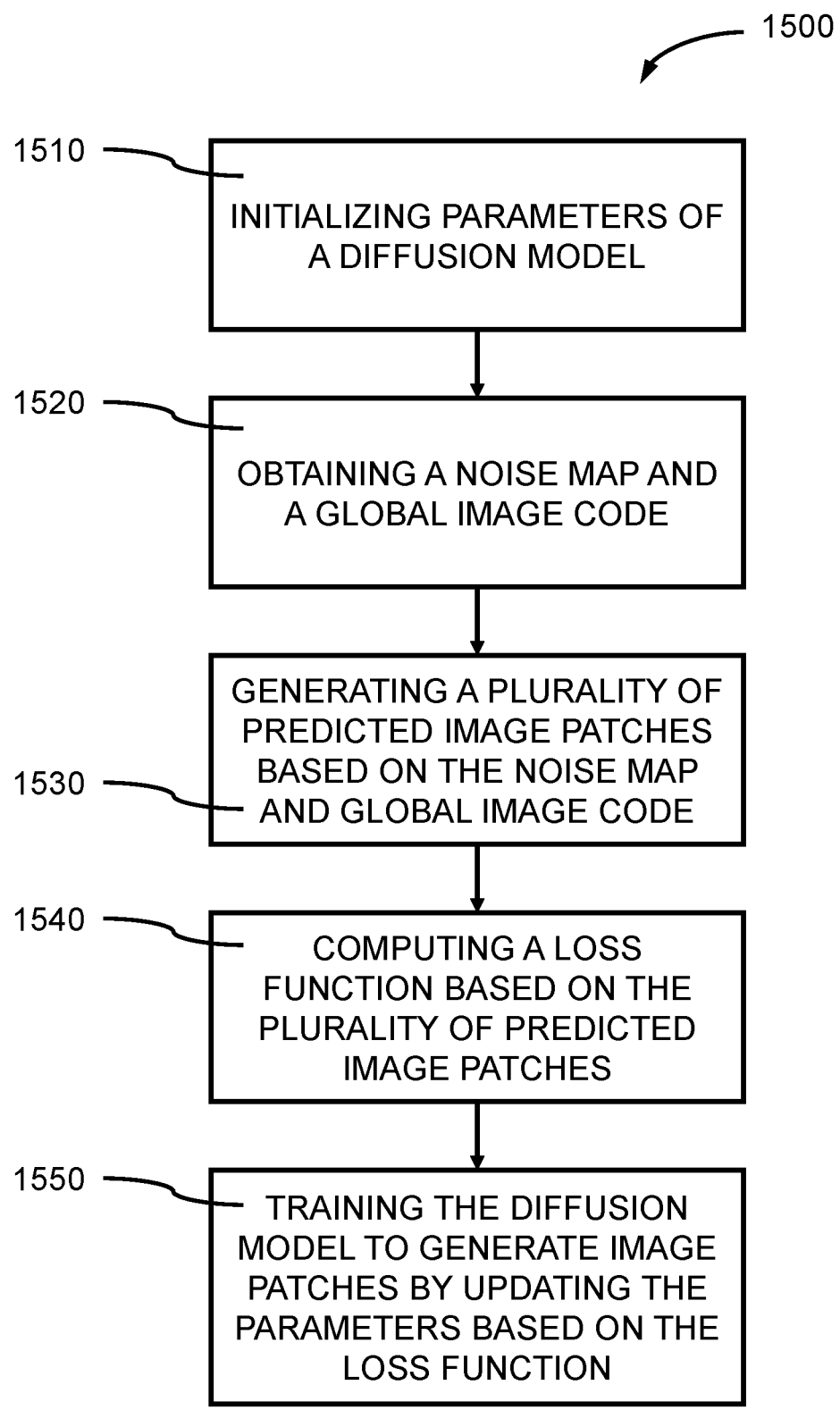
FIG. 15 shows a flow diagram for a method of training a diffusion model, according to aspects of the present disclosure.

FIG. 15 shows a flow diagram for a method of training a diffusion model, according to aspects of the present disclosure. The method of training a diffusion model 1500 can adjust the parameters of the diffusion model based on loss function.

At operation 1510, the parameters of a diffusion model can be initialized.

At operation 1520, a noise map and a global image code can be obtained.

At operation 1530, a plurality of predicted image patches can be generated based on the noise map and the global image code using the diffusion model.

At operation 1540, a loss function can be calculated based on the plurality of predicted image patches.

At operation 1550, the diffusion model can be trained to generate image patches by updating the parameters of the diffusion model based on the loss function.

Because the diffusion model is local (but globally-conditioned) it is sufficient to generate patches during training, where the patches, $p_0$, can be generated at a fixed resolution.

In various embodiments, batches of multiple patches can be used for training, where the batch size can be selected to fill a GPU's computing bandwidth to maximize efficiency of training. This is unlike previous upsampling-based approaches that involve fully generating large images at training time.

In various embodiments, the diffusion model can be pretrained to generate images of objects from original images and added noise from a noise component. The noise component can generate a noise map based on the original image and a mask, and combine the noise map with the original image through a sequence of operations to generate a noisy output image. The output image is generated based on the noise map. A learned mapping function can reduce the noise through a sequence of denoising operations to reproduce the original image, where the final output image can be compared to the original image, and the parameters of the diffusion model updated based on an error value.

Figure 16:
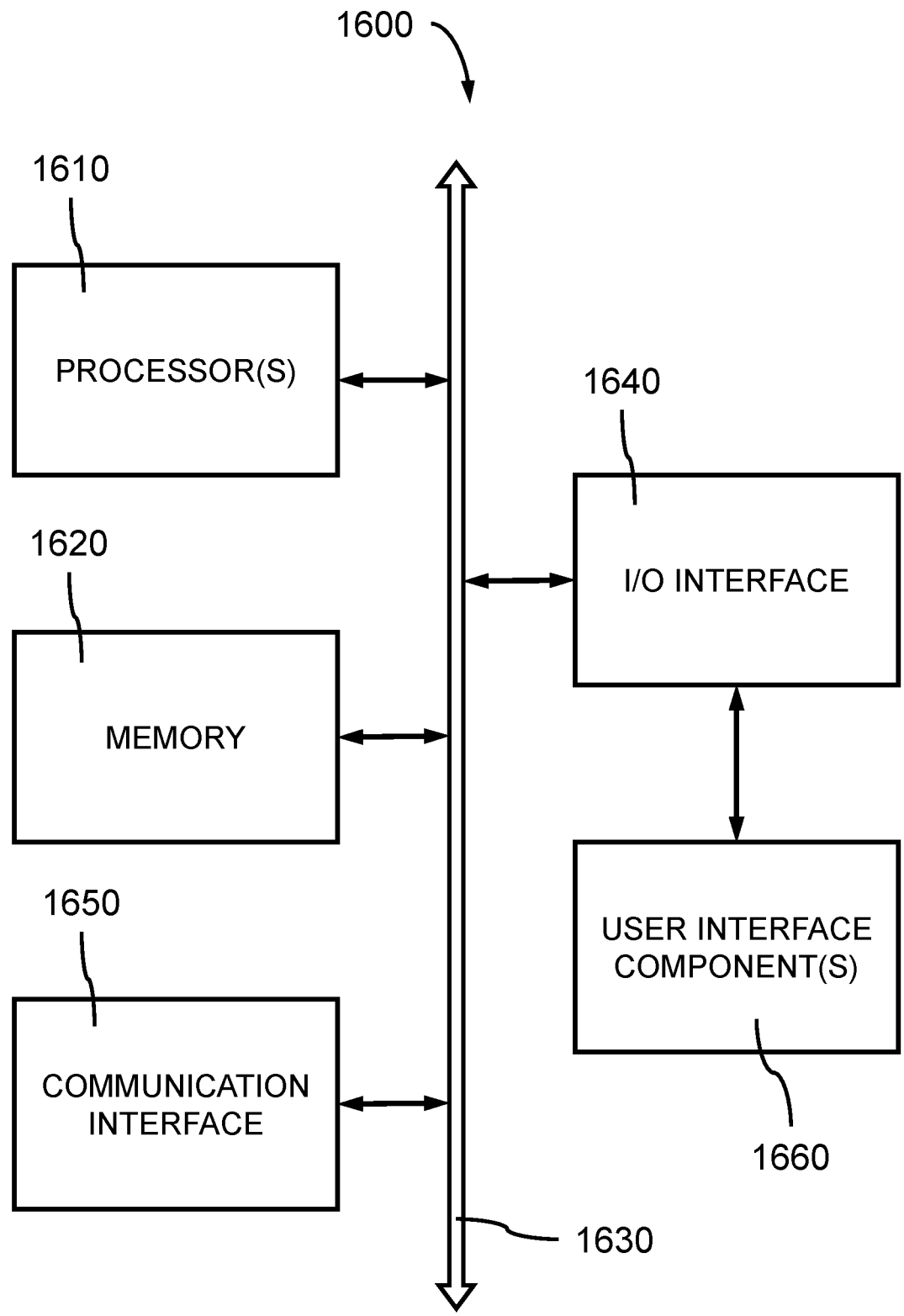
FIG. 16 shows an example of a computer system according to aspects of the present disclosure.

FIG. 16 shows an example of a computer system according to aspects of the present disclosure In one aspect, the computing device includes processor(s) 1610, memory subsystem 1620, communication interface 1650, I/O interface 1640, user interface component(s) 1660, and channel 1620. The computer system 1600 can be configured to perform the operations described above and illustrated in FIG. 1-15.

In some embodiments, computing device 1600 is an example of, or includes aspects of, image generation apparatus 200 of FIG. 2. In some embodiments, computing device 1600 includes one or more processors 1610 that can execute instructions stored in memory subsystem 1620 for identifying an original image including original content and a prompt requesting additional content to be added to a region of the original image; generating an embedding vector representing the description; and generating an output image including the original content from the original image and the additional content in the region using a diffusion model 260 that takes the embedding vector as input.

According to some aspects, computing device 1600 includes one or more processors 1610. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1610 is configured to operate a memory array using a memory controller. In other cases, a memory controller is integrated into a processor. In some cases, a processor is configured to execute computer-readable instructions stored in a memory to perform various functions. In some embodiments, a processor 1610 includes special purpose components for modem processing, baseband processing, digital signal processing, or transmission processing.

According to some aspects, memory subsystem 1620 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory 1620 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1650 operates at a boundary between communicating entities (such as computing device 1600, one or more user devices, a cloud, and one or more databases) and channel (e.g., bus) 1630 and can record and process communications. In some cases, communication interface 1650 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1640 is controlled by an I/O controller to manage input and output signals for computing device 1600. In some cases, I/O interface 1640 manages peripherals not integrated into computing device 1600. In some cases, I/O interface 1640 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1640 or via hardware components controlled by the I/O controller.

According to some aspects, user interface component(s) 1660 enable a user to interact with computing device 1600. In some cases, user interface component(s) 1660 include an audio device, such as an external speaker system, an external display device such as a display screen, an input device (e.g., a remote control device interfaced with a user interface directly or through the I/O controller), or a combination thereof. In some cases, user interface component(s) 1660 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or combinations thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or other such configuration). Thus, the functions described herein may be implemented in hardware or software and may be executed by a processor, firmware, or combinations thereof. If implemented in software executed by a processor, the functions may be stored in the form of instructions or code on a computer-readable medium.

Computer-readable media includes both non-transitory computer storage media and communication media including various mediums that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a noise map and a global image code encoded from an original image and representing semantic content of the original image;
generating a plurality of image patches based on the noise map and the global image code using a diffusion model, wherein each image patch of the plurality of image patches is generated by denoising a noisy patch of the noise map based on the global image code; and
combining the plurality of image patches to produce an output image including the semantic content.

2. The method of claim 1, wherein:
the diffusion model is conditioned based on the global image code.

3. The method of claim 1, further comprising:
identifying a text prompt; and
encoding the text prompt to obtain the global image code.

4. The method of claim 1, wherein the original image is a high resolution image.

5. The method of claim 1, wherein:
the noise map comprises a same resolution as the output image.

6. The method of claim 1, wherein:
each of the plurality of image patches is generated based on a region of the noise map that overlaps at least one other region used to generate another of the plurality of image patches.

7. The method of claim 6, wherein:
the plurality of image patches do not overlap each other.

8. The method of claim 1, further comprising:
identifying a position indicator corresponding to each of the plurality of image patches, wherein each of the plurality of image patches is generated based on the corresponding position indicator and the plurality of image patches are combined based on the position indicator.

9. The method of claim 1, further comprising:
training the diffusion model to generate the plurality of image patches based on the global image code.

10. The method of claim 1, wherein:
the global image code includes information representing a spatial layout of the output image.

11. A method comprising:
initializing parameters of a diffusion model;
obtaining a noise map and a global image code encoded from a training image and representing semantic content of the training image;
generating a plurality of predicted image patches based on the noise map and the global image code using the diffusion model, wherein each predicted image patch of the plurality of predicted image patches is generated by denoising a noisy patch of the noise map based on the global image code;
computing a loss function based on the plurality of predicted image patches; and
training the diffusion model to generate image patches by updating the parameters based on the loss function.

12. The method of claim 11, wherein:
identifying a high-resolution training image;
generating a high-resolution noise map and a low-resolution noise map based on the high-resolution training image;
generating a first image patch based on the high-resolution noise map and a second image patch based on the low-resolution noise map; and
computing a patch consistency loss by comparing the first image patch and the second image patch, wherein the loss function includes the patch consistency loss.

13. The method of claim 12, further comprising:
cropping the high-resolution training image to obtain a high-resolution training patch; and
adding noise to the high-resolution training patch to obtain the high-resolution noise map.

14. The method of claim 12, further comprising:
down-sampling the high-resolution training image to obtain a low-resolution training image;
cropping the low-resolution training image to obtain a low-resolution training patch; and
adding noise to the low-resolution training patch to obtain the low-resolution noise map.

15. The method of claim 11, further comprising:
combining the plurality of predicted image patches to produce a predicted image; and
computing a reconstruction loss by comparing the predicted image to a ground truth image, wherein the loss function includes the reconstruction loss.

16. The method of claim 11, further comprising:
identifying a position indicator corresponding each of the plurality of predicted image patches, wherein each of the plurality of predicted image patches is generated based on the corresponding position indicator.

17. An apparatus comprising:
one or more processors; and
one or memories including instructions executable by the one or more processors to:
obtain a noise map and a global image code encoded from an original image and representing semantic content of the original image;
generate a plurality of image patches based on the noise map and the global image code using a diffusion model, wherein each image patch of the plurality of image patches is generated by denoising a noisy patch of the noise map based on the global image code; and
combine the plurality of image patches to produce an output image including the semantic content.

18. The apparatus of claim 17, wherein:
the diffusion model comprises a U-Net architecture.

19. The apparatus of claim 17, wherein the instructions are further executable to:
encode an input prompt to obtain the global image code.

20. The apparatus of claim 19, wherein:
the global image code is encoded using a multimodal encoder, and wherein the original image is a high resolution image.

* * * * *